(12) United States Patent
Takahashi

(10) Patent No.: US 11,063,737 B2
(45) Date of Patent: Jul. 13, 2021

(54) RECEPTION DEVICE, TRANSMISSION DEVICE, COMMUNICATION SYSTEM, SIGNAL RECEPTION METHOD, SIGNAL TRANSMISSION METHOD, AND COMMUNICATION METHOD

(71) Applicant: Sony Corporation, Tokyo (JP)

(72) Inventor: Hiroo Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 346 days.

(21) Appl. No.: 16/086,102

(22) PCT Filed: Apr. 11, 2017

(86) PCT No.: PCT/JP2017/014747
§ 371 (c)(1),
(2) Date: Sep. 18, 2018

(87) PCT Pub. No.: WO2017/183508
PCT Pub. Date: Oct. 26, 2017

(65) Prior Publication Data
US 2020/0304281 A1    Sep. 24, 2020

(30) Foreign Application Priority Data

Apr. 20, 2016  (JP) ............................. JP2016-084406

(51) Int. Cl.
*H04B 3/00*  (2006.01)
*H04L 25/00* (2006.01)
*H04L 7/00*  (2006.01)
(52) U.S. Cl.
CPC .......... *H04L 7/0008* (2013.01); *H04L 7/0079* (2013.01); *H04L 7/0091* (2013.01)

(58) Field of Classification Search
CPC ... H04L 7/0008; H04L 7/0079; H04L 7/0091; H04L 7/0025; H04N 21/4122; G06F 1/08; G09G 3/3648
(Continued)

(56) References Cited

U.S. PATENT DOCUMENTS 9,094,246 B1    7/2015  Chi et al.
10,419,200 B2 *  9/2019  Takahashi ............. H04L 7/0025
(Continued)

FOREIGN PATENT DOCUMENTS

CN           1131299 A    9/1996
CN           1441353 A    9/2003
(Continued)

OTHER PUBLICATIONS

Japanese Office Action dated Jun. 30, 2020 for corresponding Japanese Application No. 2016-084406.
(Continued)

*Primary Examiner* — Phuong Phu
(74) *Attorney, Agent, or Firm* — Michael Best & Friedrich LLP

(57) ABSTRACT

There is provided a reception device including a data signal receiver circuit, a clock signal receiver circuit, and a discrimination circuit. The data signal receiver circuit receives a data signal through a data signal line, and receives a data blanking signal through the data signal line in a blanking period of the data signal. The clock signal receiver circuit receives a clock signal and a clock blanking signal through a clock signal line, the clock blanking signal outputted in synchronization with the blanking period of the data signal. The discrimination circuit discriminates communication modes on a basis of one or both of a signal value of the data blanking signal and a signal value of the clock blanking signal.

23 Claims, 25 Drawing Sheets

(58) Field of Classification Search
USPC ............... 375/257, 219, 220, 222, 295, 316
See application file for complete search history.

(56) References Cited

U.S. PATENT DOCUMENTS

| | | | |
|---|---|---|---|
| 2010/0329339 A1* | 12/2010 | Kanagawa | H04N 21/4122 |
| | | | 375/240.16 |
| 2011/0268198 A1 | 11/2011 | Aoki | |
| 2012/0169698 A1* | 7/2012 | Park | G09G 3/3648 |
| | | | 345/211 |
| 2014/0189415 A1* | 7/2014 | Chen | G06F 1/08 |
| | | | 713/600 |
| 2015/0229467 A1 | 8/2015 | Lee et al. | |
| 2015/0262547 A1 | 9/2015 | Higashino | |
| 2016/0041604 A1 | 2/2016 | Choi et al. | |

FOREIGN PATENT DOCUMENTS

| | | |
|---|---|---|
| CN | 101331771 A | 12/2008 |
| CN | 101517632 A | 8/2009 |
| CN | 102270423 A | 12/2011 |
| CN | 103068018 A | 4/2013 |
| CN | 104350481 A | 2/2015 |
| CN | 204539307 U | 8/2015 |
| CN | 104915165 A | 9/2015 |
| JP | 2002344540 A | 11/2002 |
| JP | 2007282186 A | 10/2007 |
| JP | 2010124268 A | 6/2010 |
| JP | 2014-522204 A | 8/2014 |
| JP | 2015094806 A | 5/2015 |
| JP | 2015177364 A | 10/2015 |
| KR | 20150095500 A | 8/2015 |
| WO | 2013/164937 A1 | 11/2013 |

OTHER PUBLICATIONS

Chinese Office Action dated Jan. 5, 2021 for corresponding Chinese Application No. 2017800235704.
Korean Office Action dated Apr. 26, 2021 for corresponding Korean Application No. 10-2018-7028424.

* cited by examiner

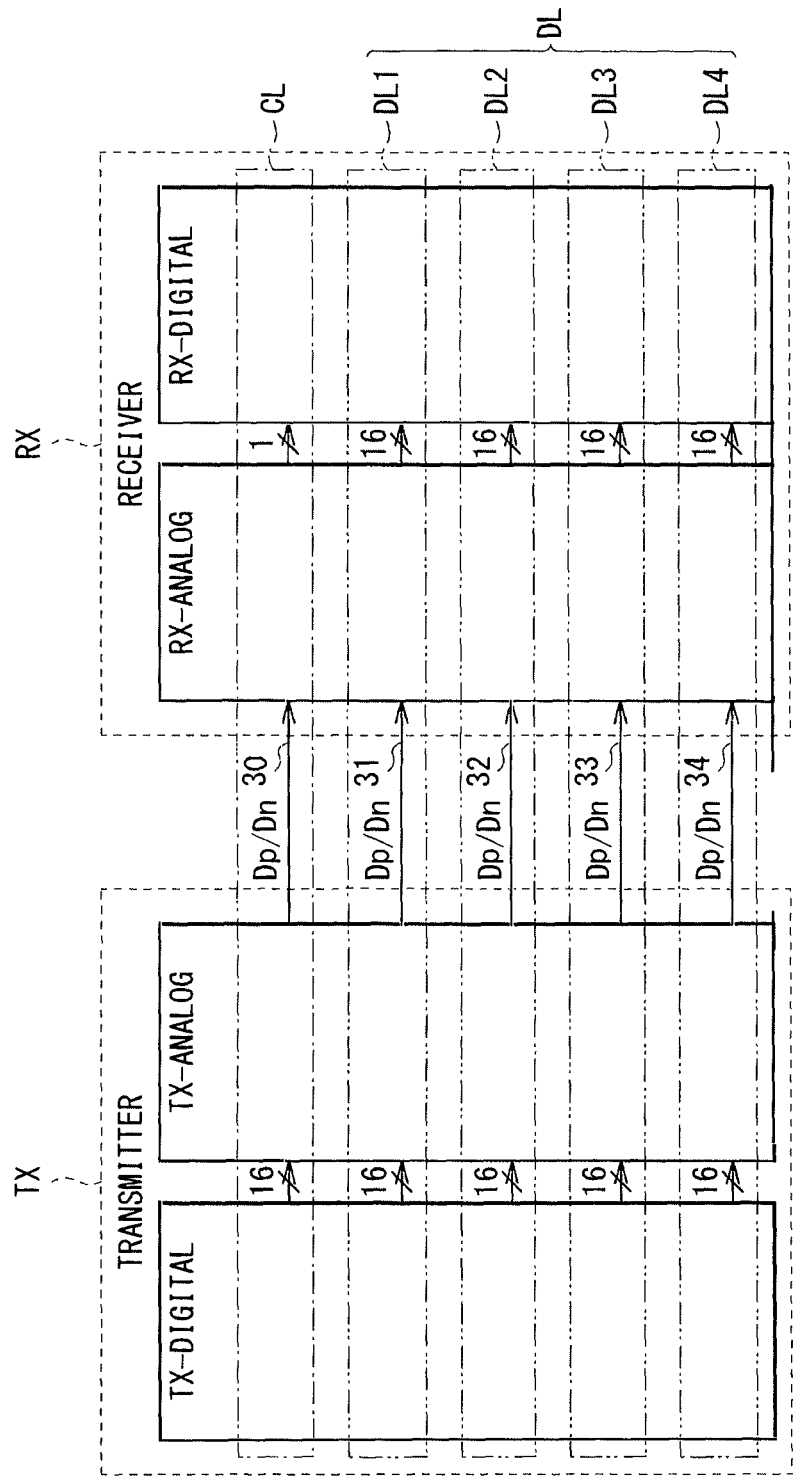
[FIG. 1]

[FIG.2]
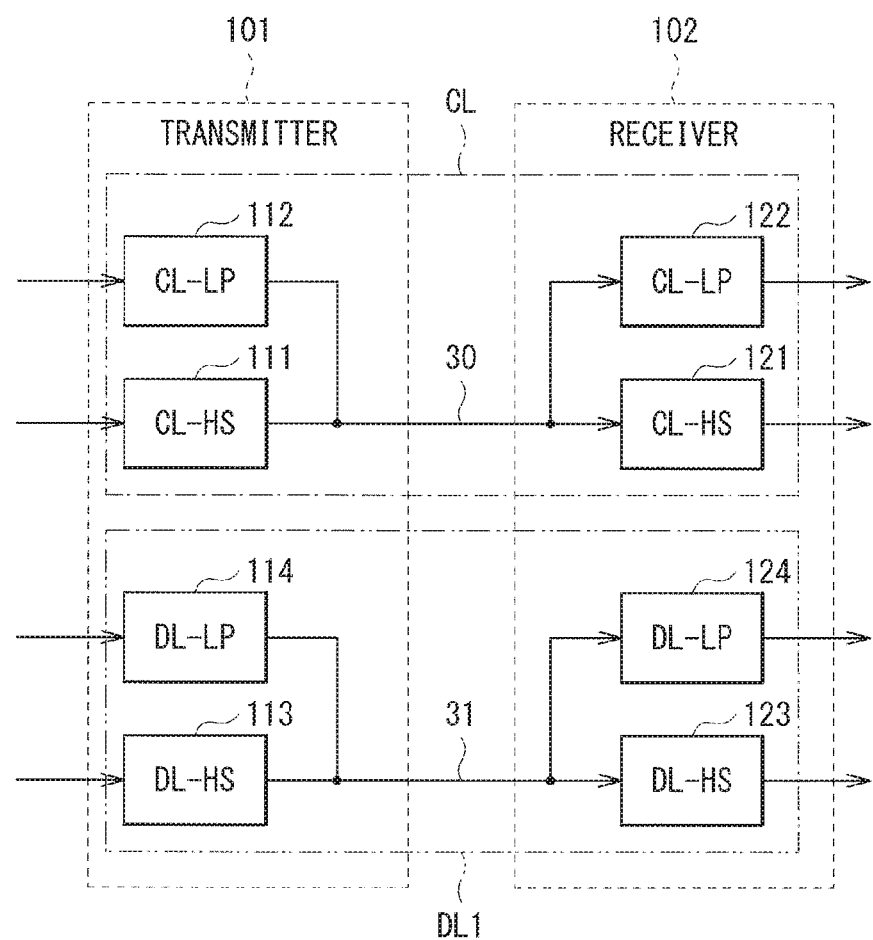

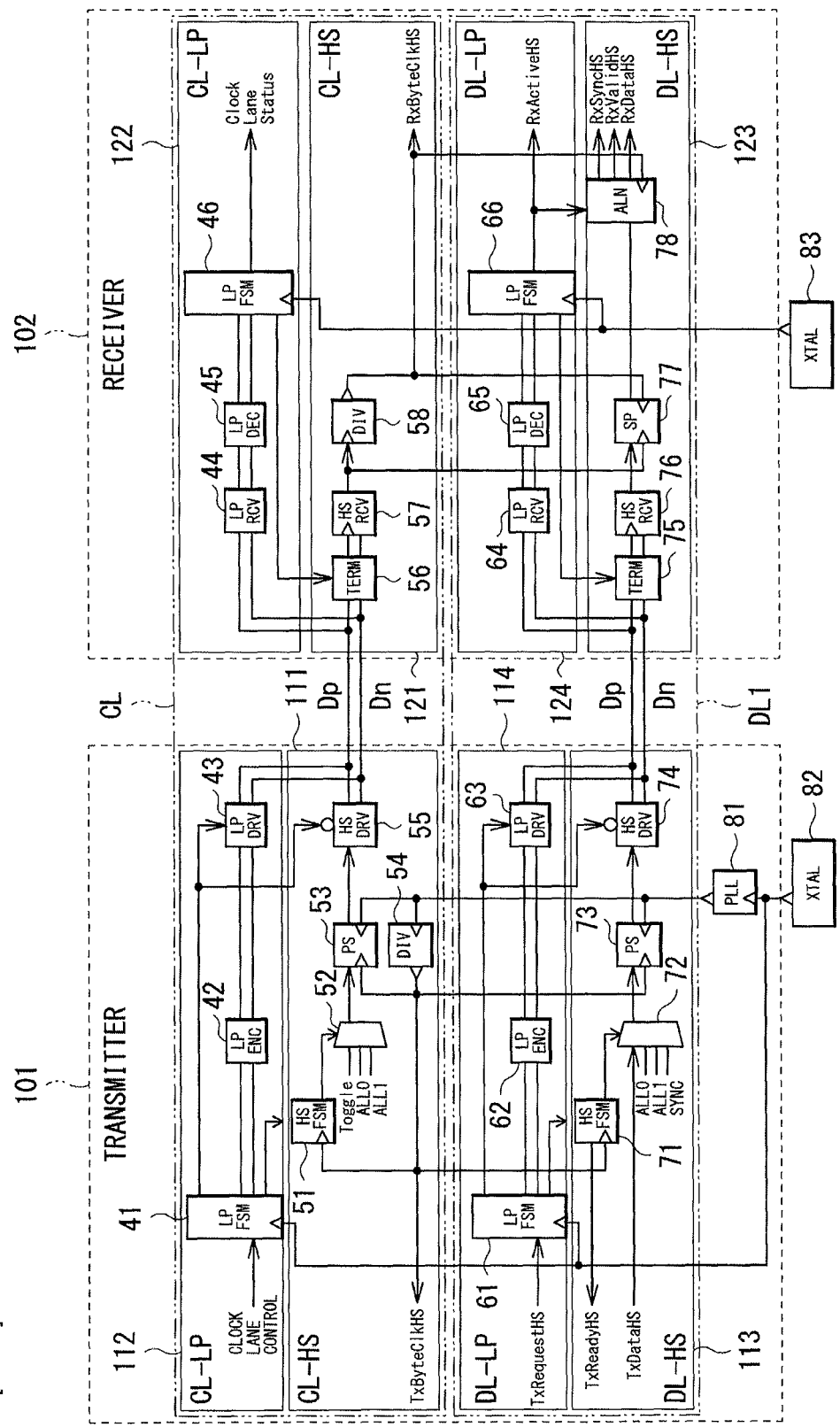
[FIG. 3]

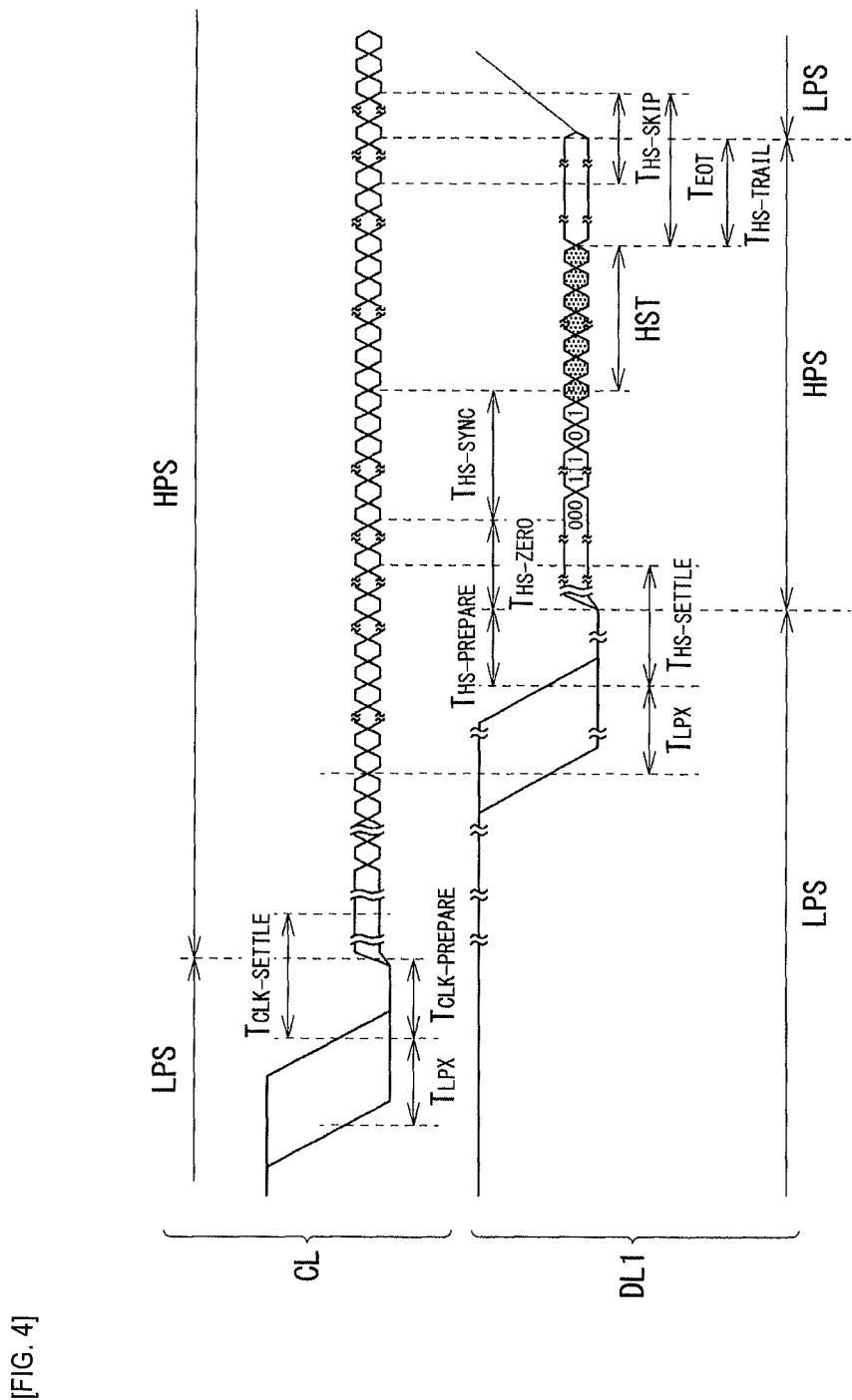
[FIG. 4]

[FIG. 5]
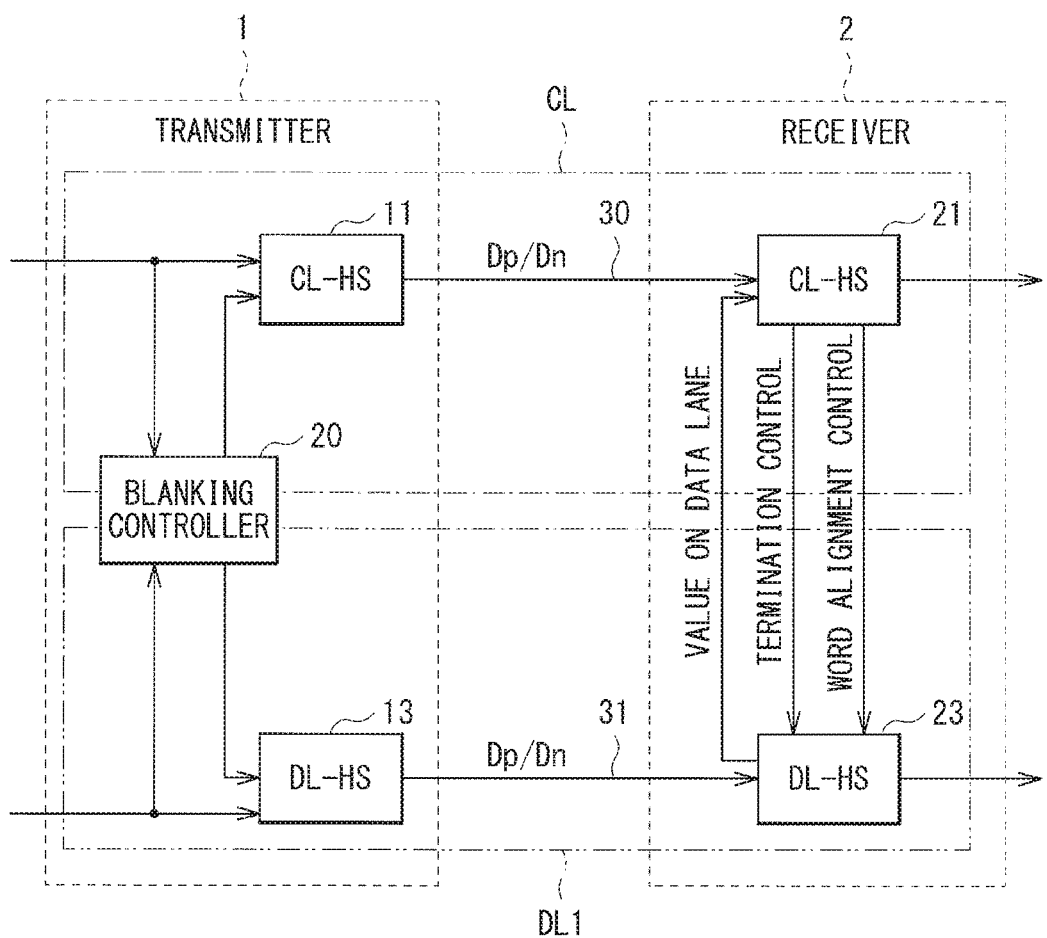

[FIG. 6]
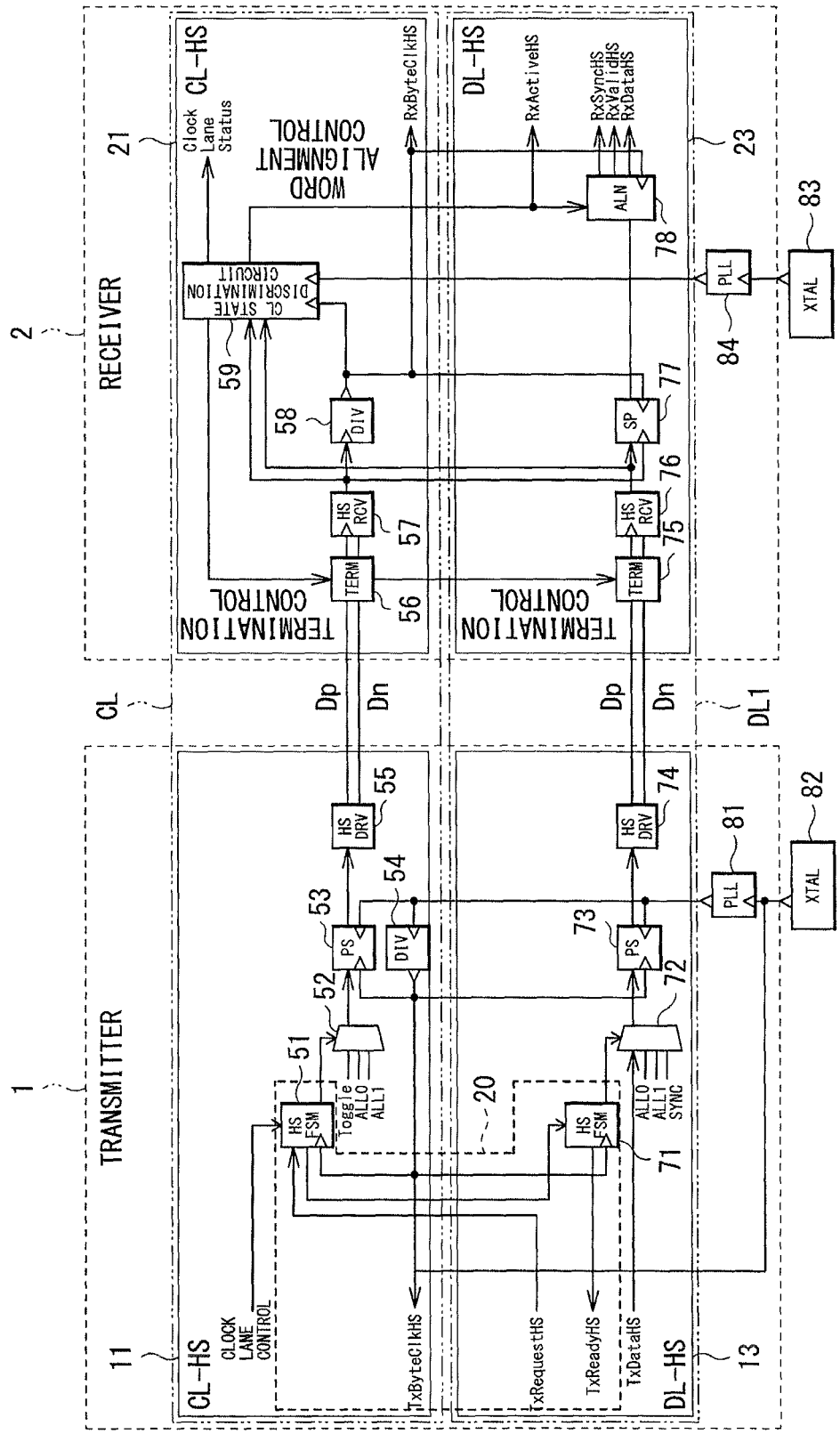

[ FIG. 7 ]
| BLANKING MODE | TRANSMISSION PERIOD (BLANKING PERIOD) | TERMINATION CONTROL |
|---|---|---|
| FIRST BLANKING MODE (LRTE) | SHORT, FIXED LENGTH | WITHOUT TERMINATION CONTROL |
| SECOND BLANKING MODE (ALP) | LONG, VARIABLE LENGTH | WITH TERMINATION CONTROL |
[ FIG. 8 ]
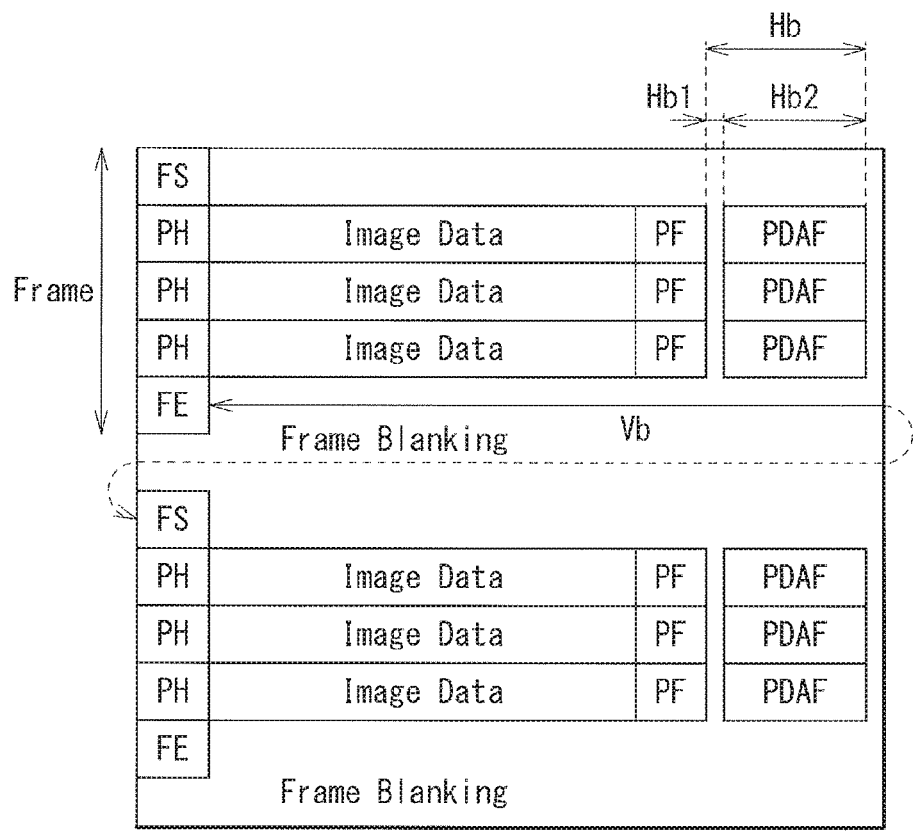

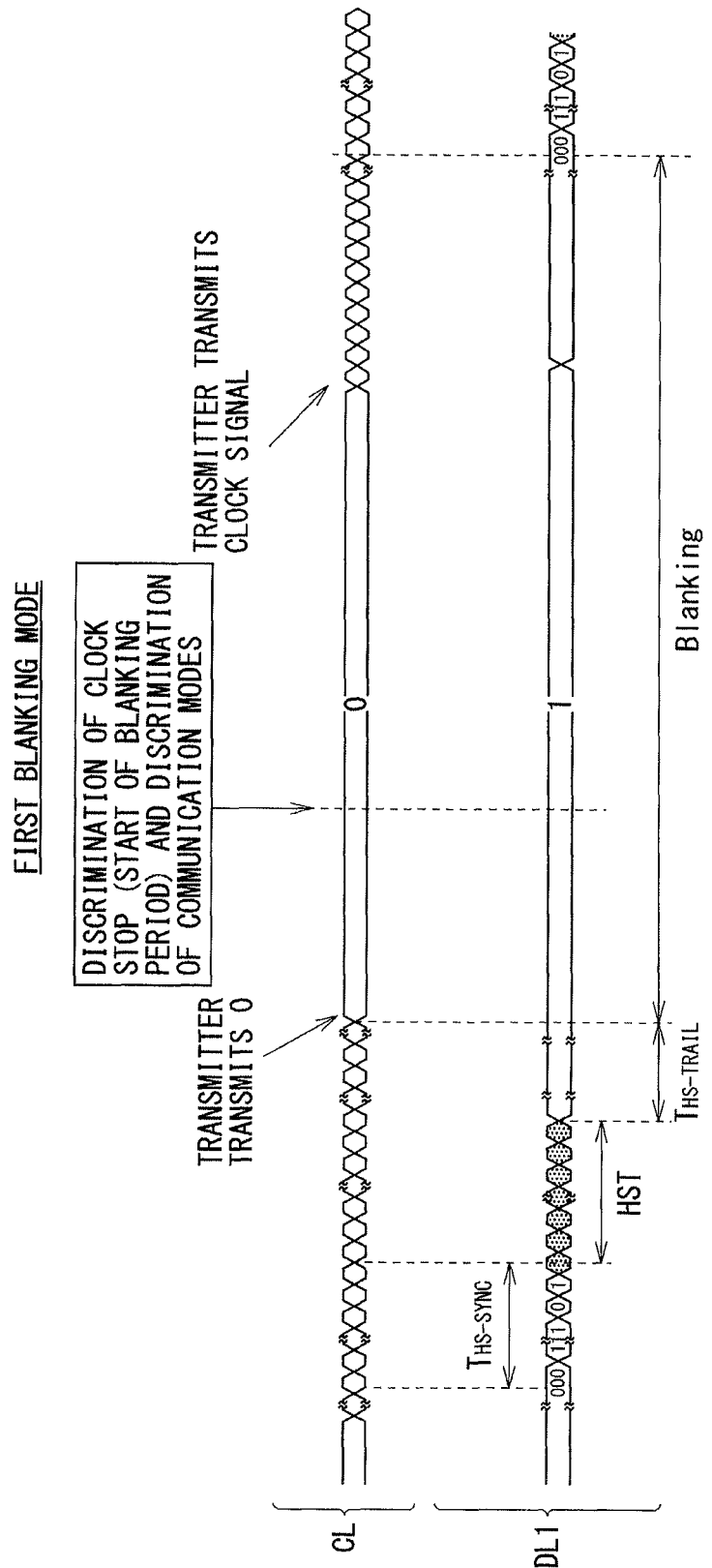

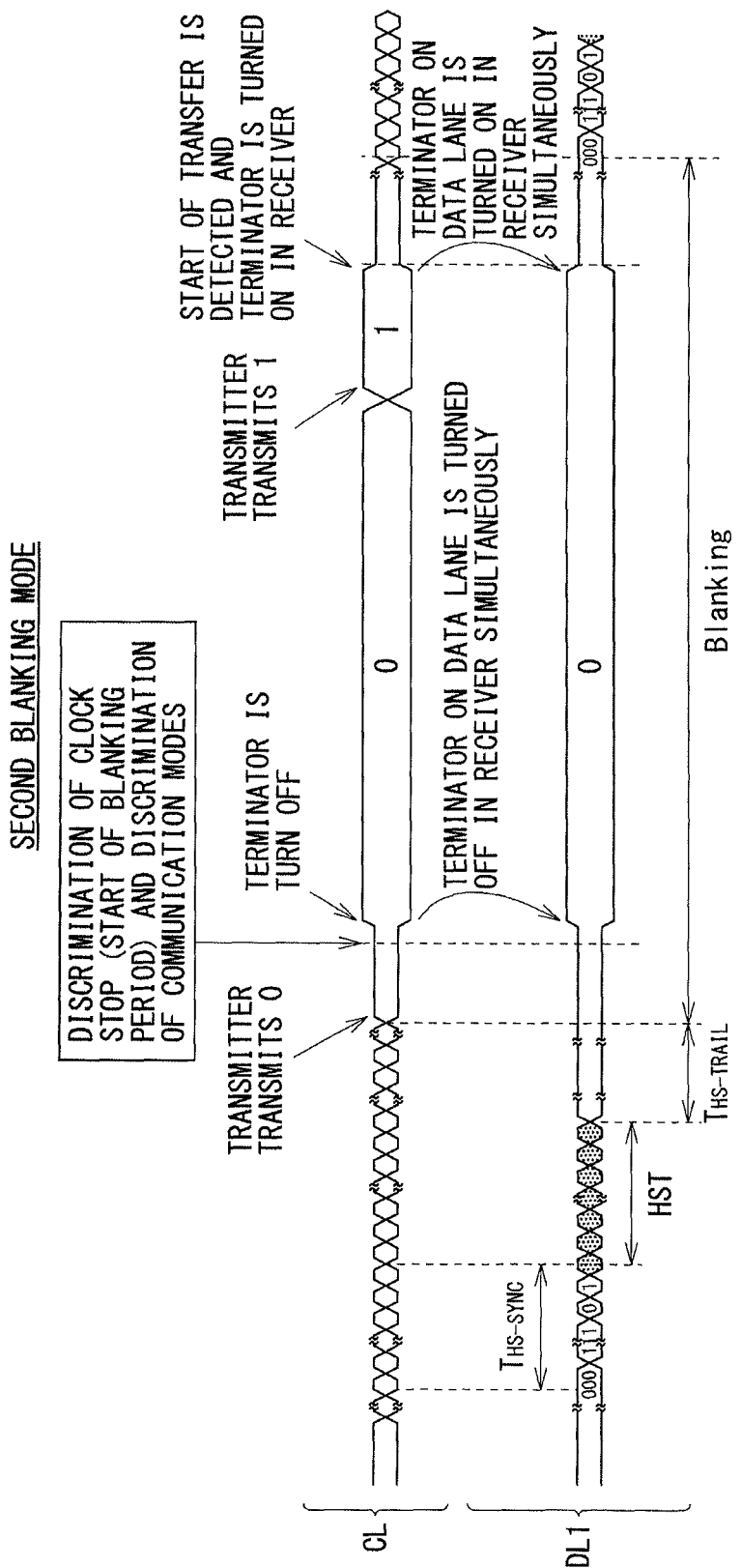

[ FIG. 11 ]

| State Code | Line Voltage Levels | | High-Speed Burst Mode |
|---|---|---|---|
| | Dp-Line | Dn-Line | |
| 0 | HS Low | HS High | Differential-0 |
| 1 | HS High | HS Low | Differential-1 |

[ FIG. 12 ]
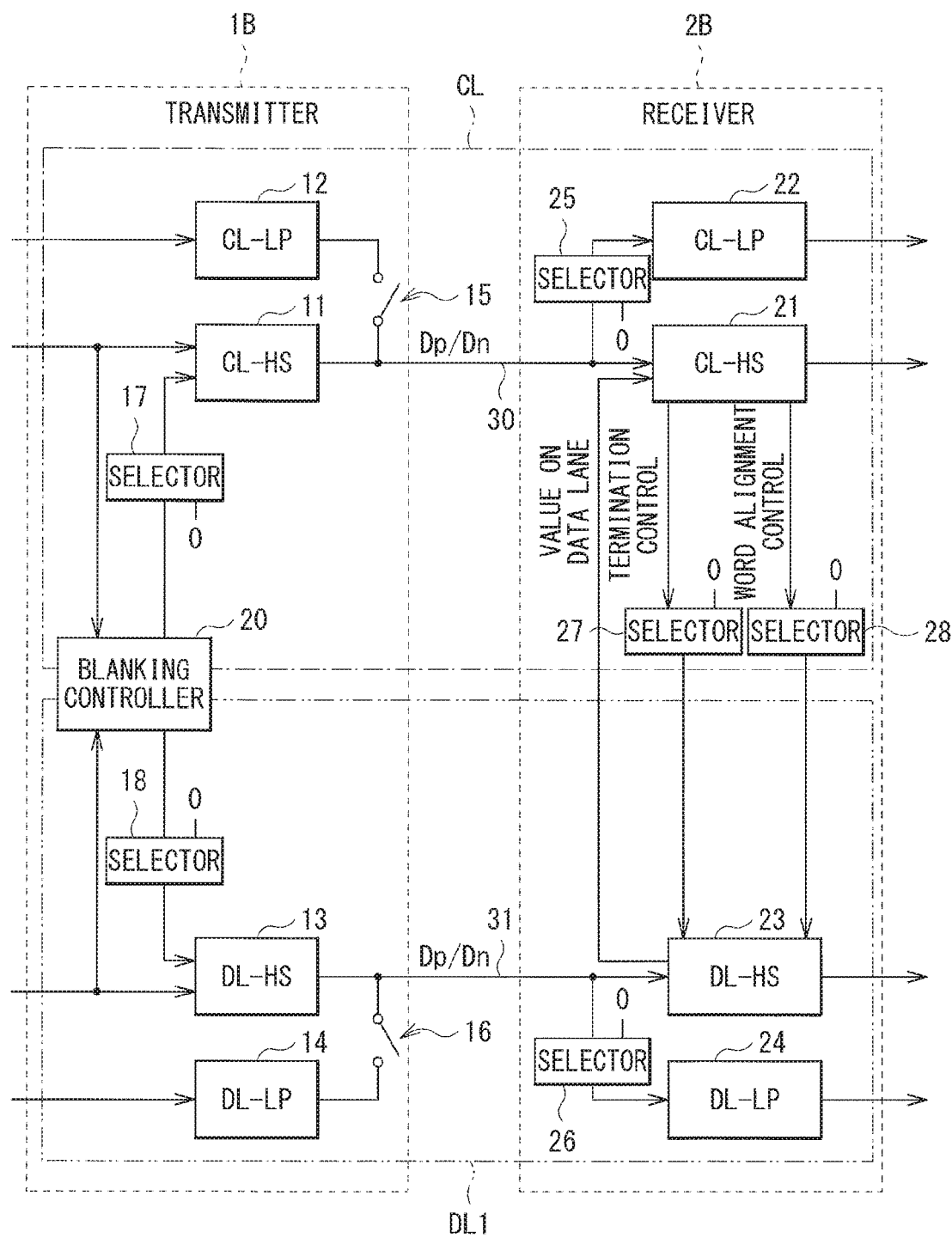

[ FIG. 13 ]
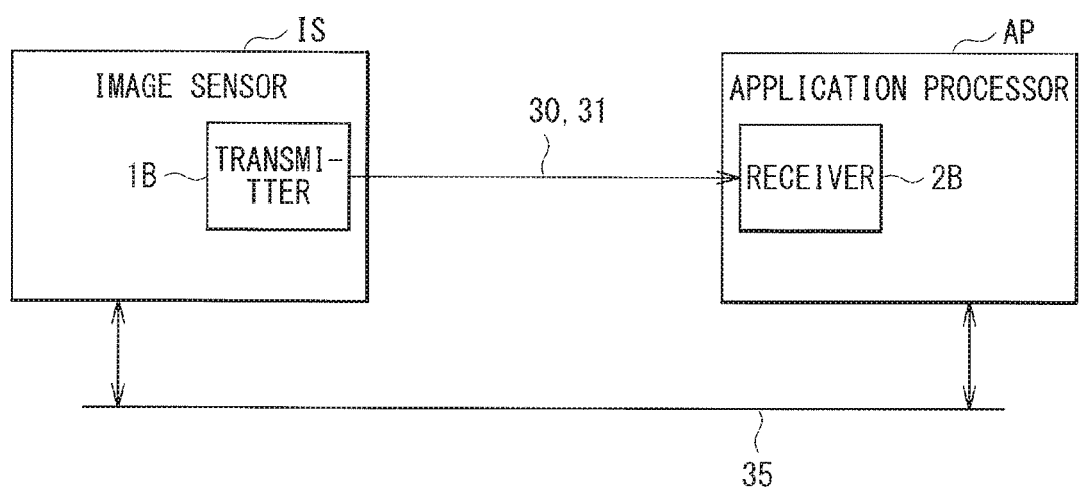

[ FIG. 14 ]
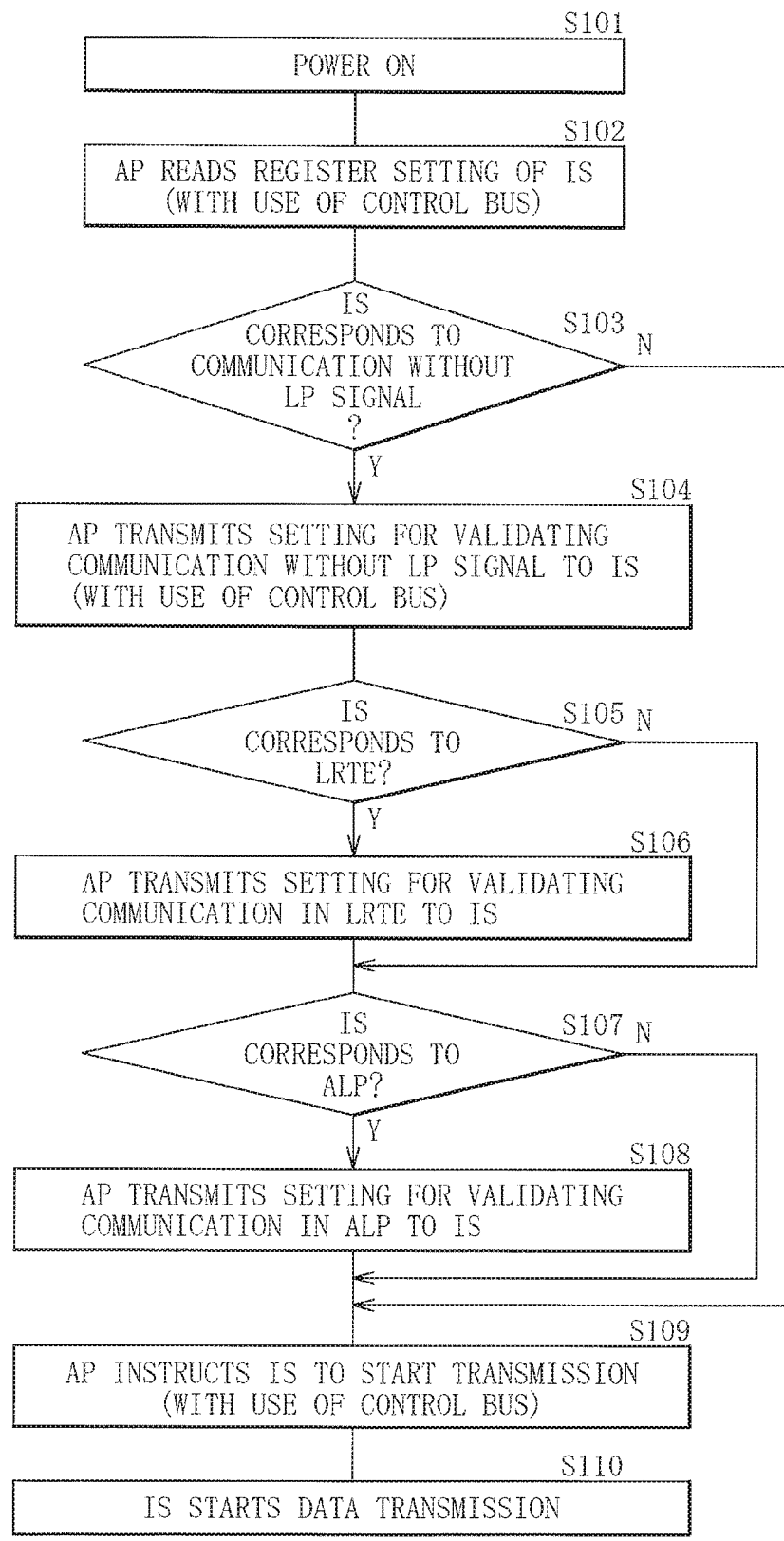

[ FIG. 15 ]

| DATA TRANSMISSION MODE | TRANSMISSION SPEED |
|---|---|
| FIRST TRANSMISSION MODE (HIGH-SPEED TRANSMISSION MODE) | HIGH SPEED |
| SECOND TRANSMISSION MODE (LOW-SPEED TRANSMISSION MODE) | LOW SPEED |

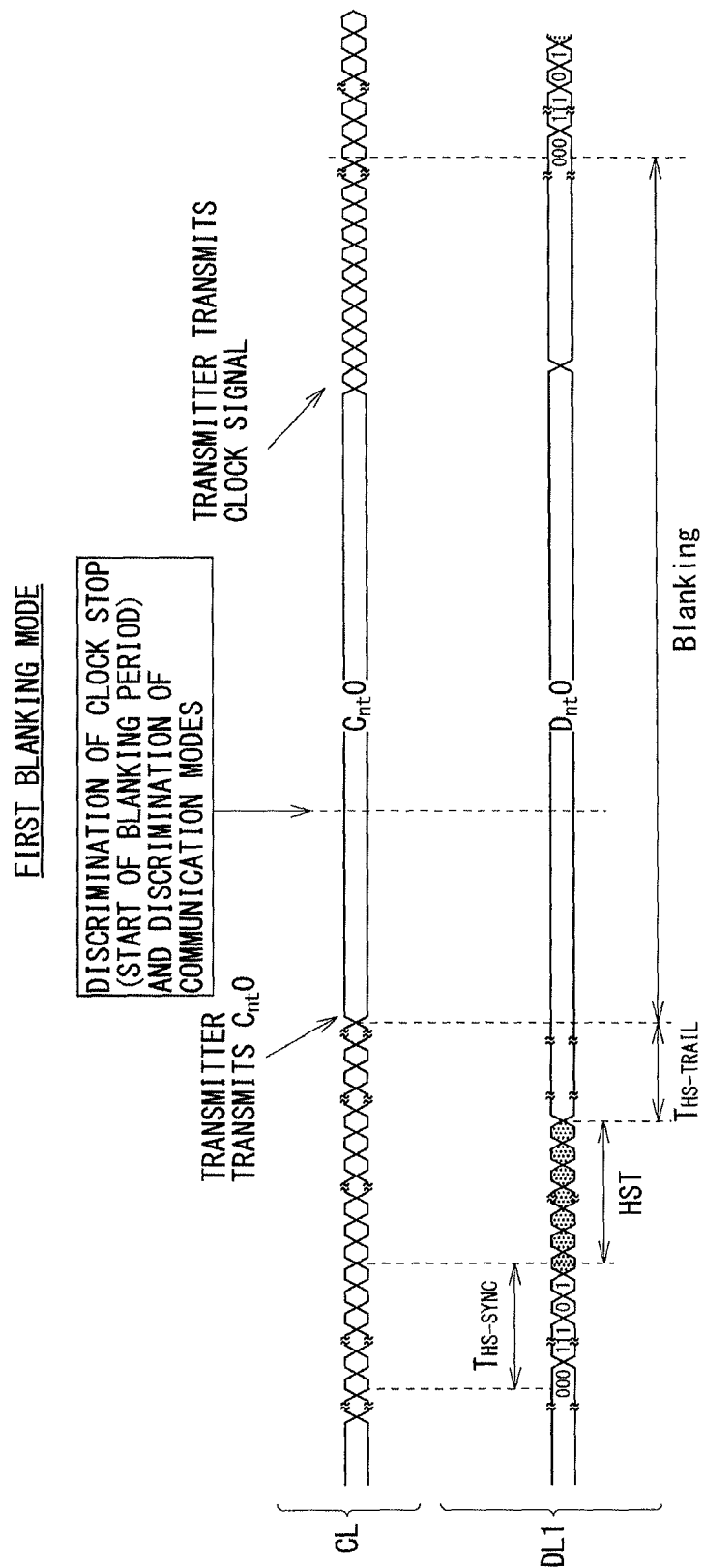

[ FIG. 17 ]

|  | | $C_{nt}0$ | |
|---|---|---|---|
|  | | 0 | 1 |
| $D_{nt}0$ | 0 | HIGH-SPEED TRANSMISSION MODE | Reserved |
| | 1 | LRTE | LOW-SPEED TRANSMISSION MODE |

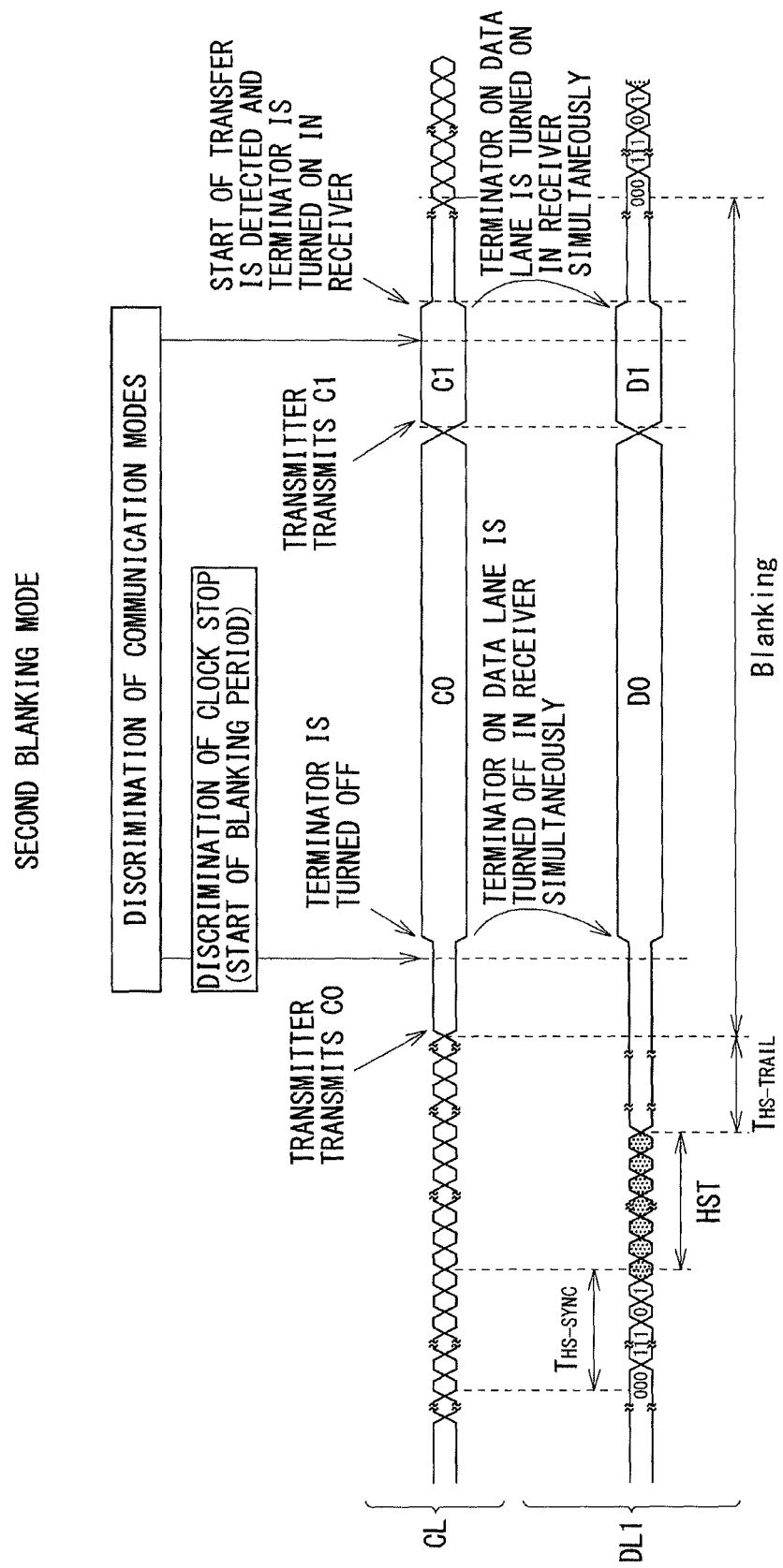

[FIG. 19]

| | | (C0, C1) | | | |
|---|---|---|---|---|---|
| | | (0, 1) | (1, 0) | (0, 0) | (1, 1) |
| (D0, D1) | (0, 0) | HIGH-SPEED TRANSMISSION MODE | Reserved | — | — |
| | (0, 1) | LOW-SPEED TRANSMISSION MODE | Reserved | Reserved | Reserved |
| | (1, 0) | Reserved | Reserved | Reserved | Reserved |
| | (1, 1) | Reserved | Reserved | — | — |

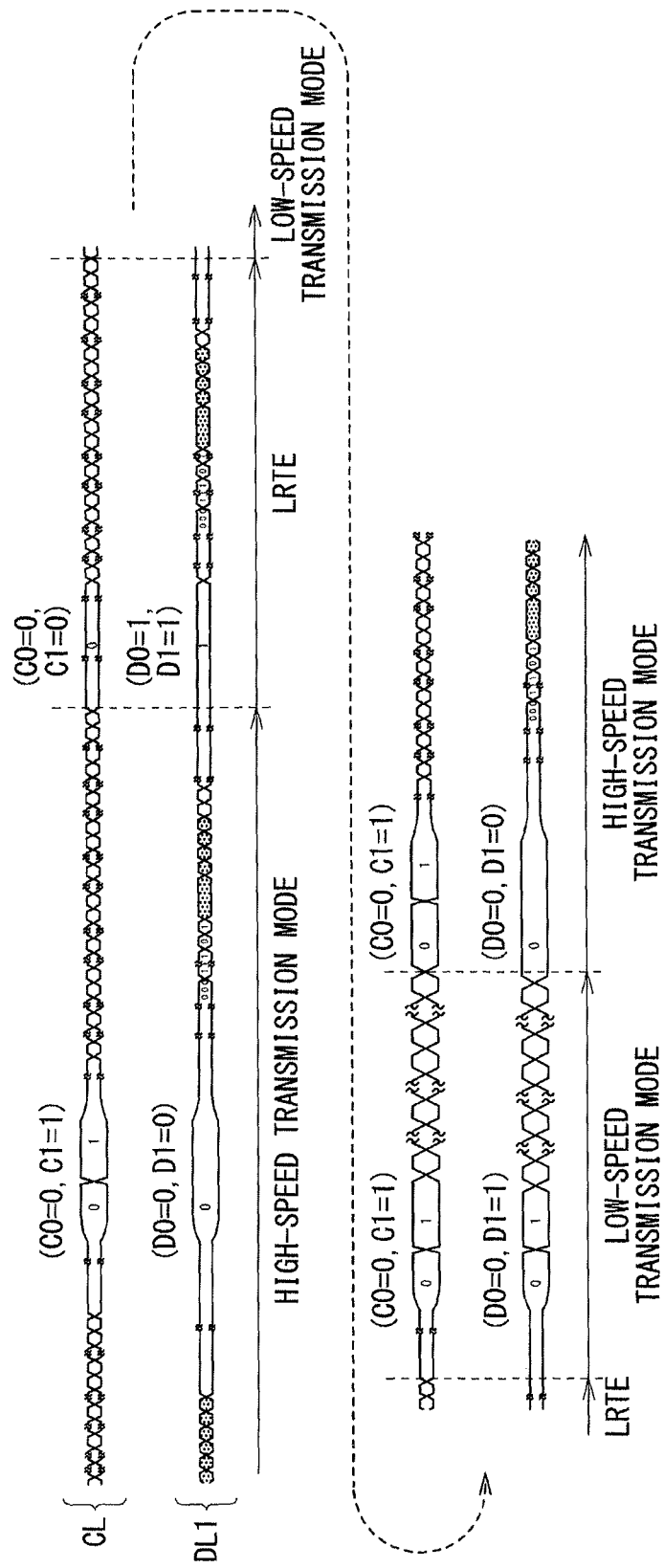
[FIG. 20]

[FIG. 21]

| C0 | D0 | TERMINATOR ON/OFF | C1 | D1 | TERMINATOR ON/OFF | DESCRIPTION |
|---|---|---|---|---|---|---|
| 0 | 0 | OFF | 0 | 0 | Reserved | Reserved |
| | | | | 1 | Reserved | Reserved |
| | | | 1 | 0 | ON | HIGH-SPEED TRANSMISSION MODE STARTS |
| | | | | 1 | OFF | LOW-SPEED TRANSMISSION MODE STARTS |
| | 1 | ON | 0 | 0 | Reserved | Reserved |
| | | | | 1 | ON | LRTE STARTS |
| | | | 1 | 0 | Reserved | Reserved |
| | | | | 1 | Reserved | Reserved |
| 1 | 0 | Reserved | 0 | 0 | Reserved | Reserved |
| | | | | 1 | Reserved | Reserved |
| | | | 1 | 0 | Reserved | Reserved |
| | | | | 1 | Reserved | Reserved |
| | 1 | Reserved | 0 | 0 | Reserved | Reserved |
| | | | | 1 | Reserved | Reserved |
| | | | 1 | 0 | Reserved | Reserved |
| | | | | 1 | Reserved | Reserved |

[ FIG. 22 ]
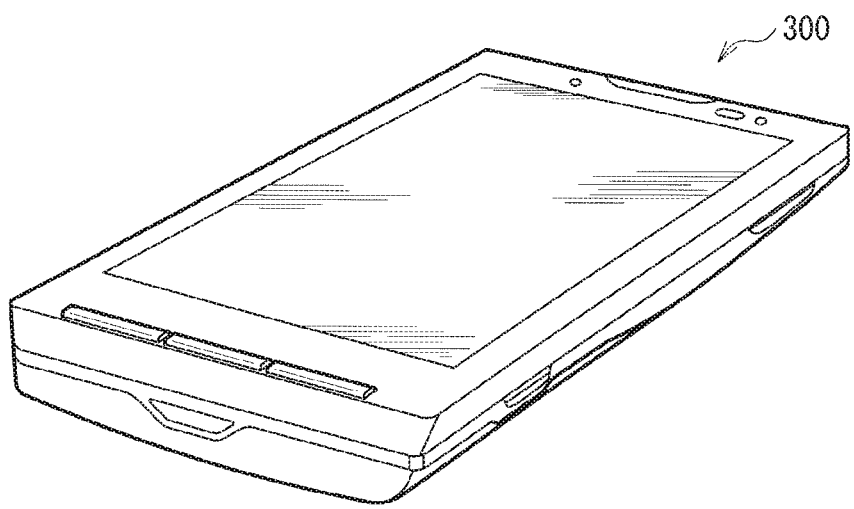

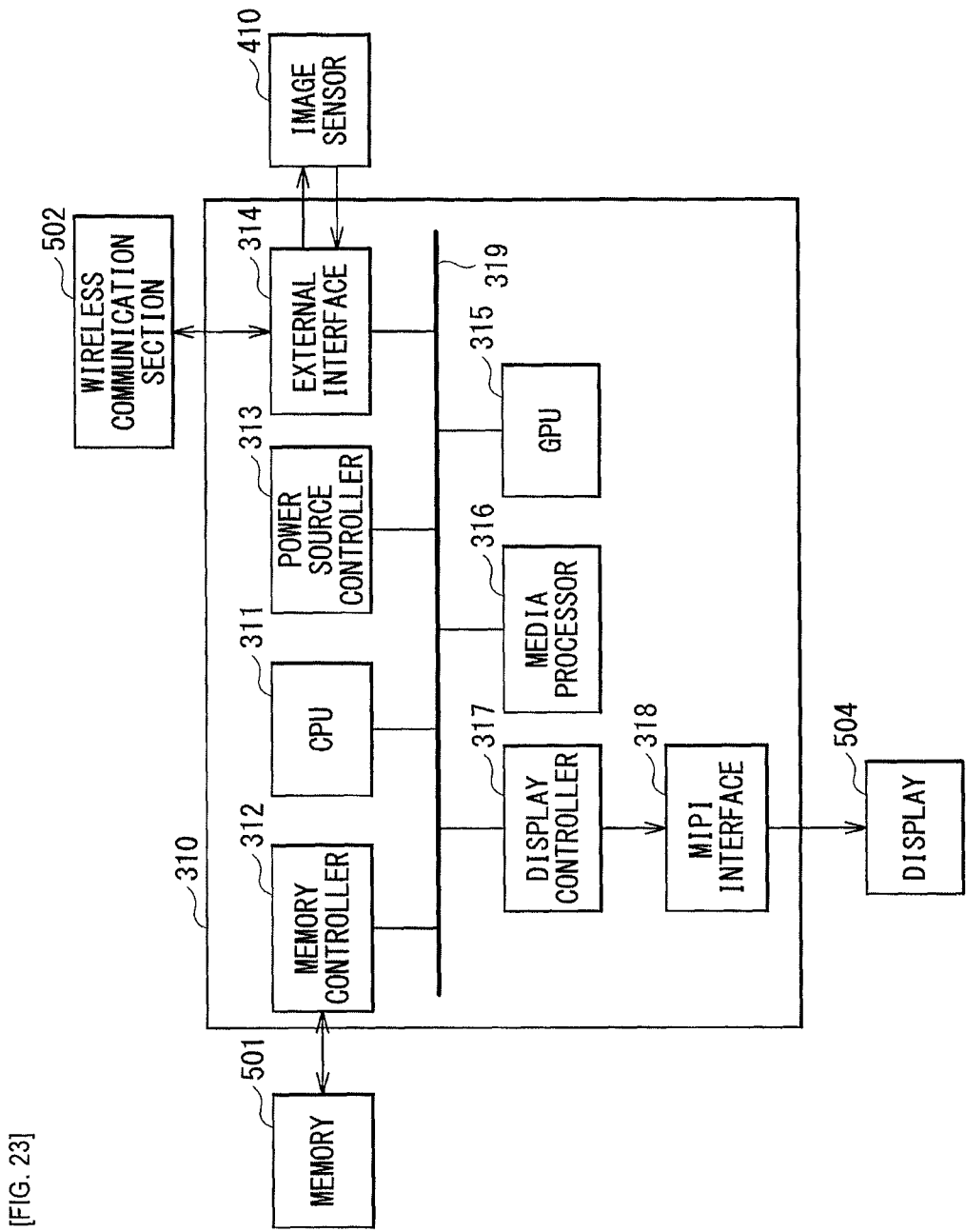
[FIG. 23]

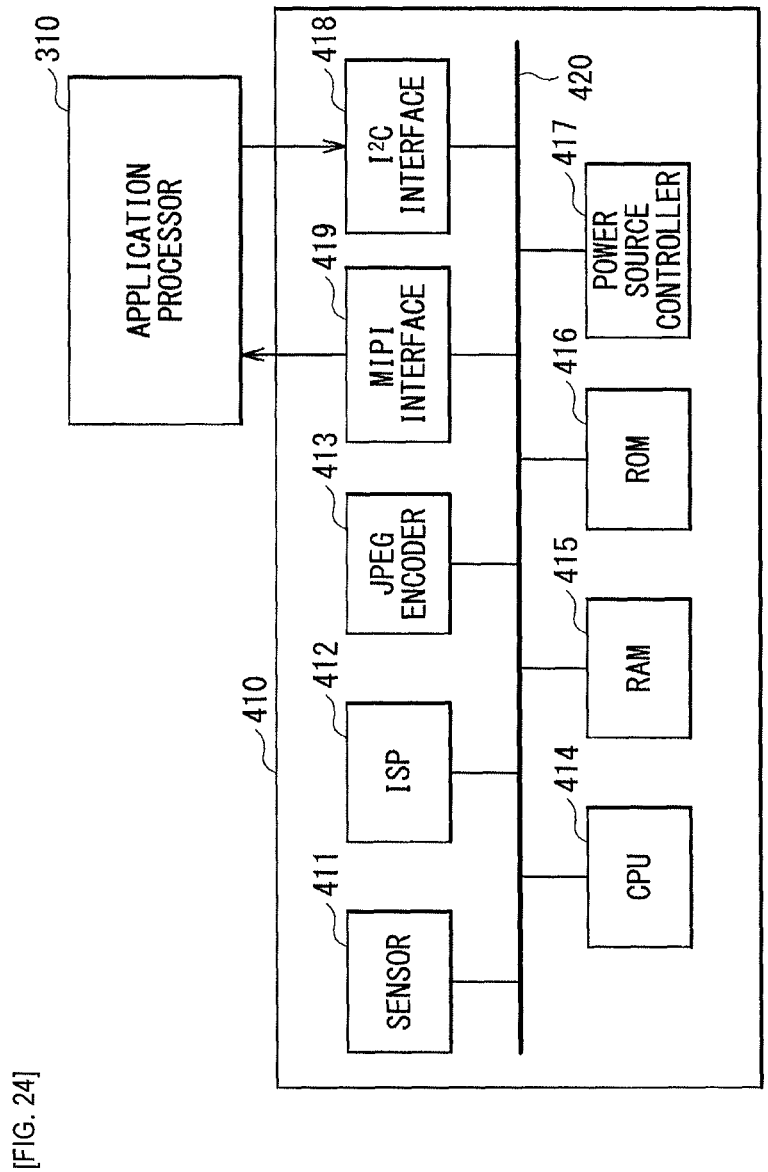
[FIG. 24]

[FIG. 25]
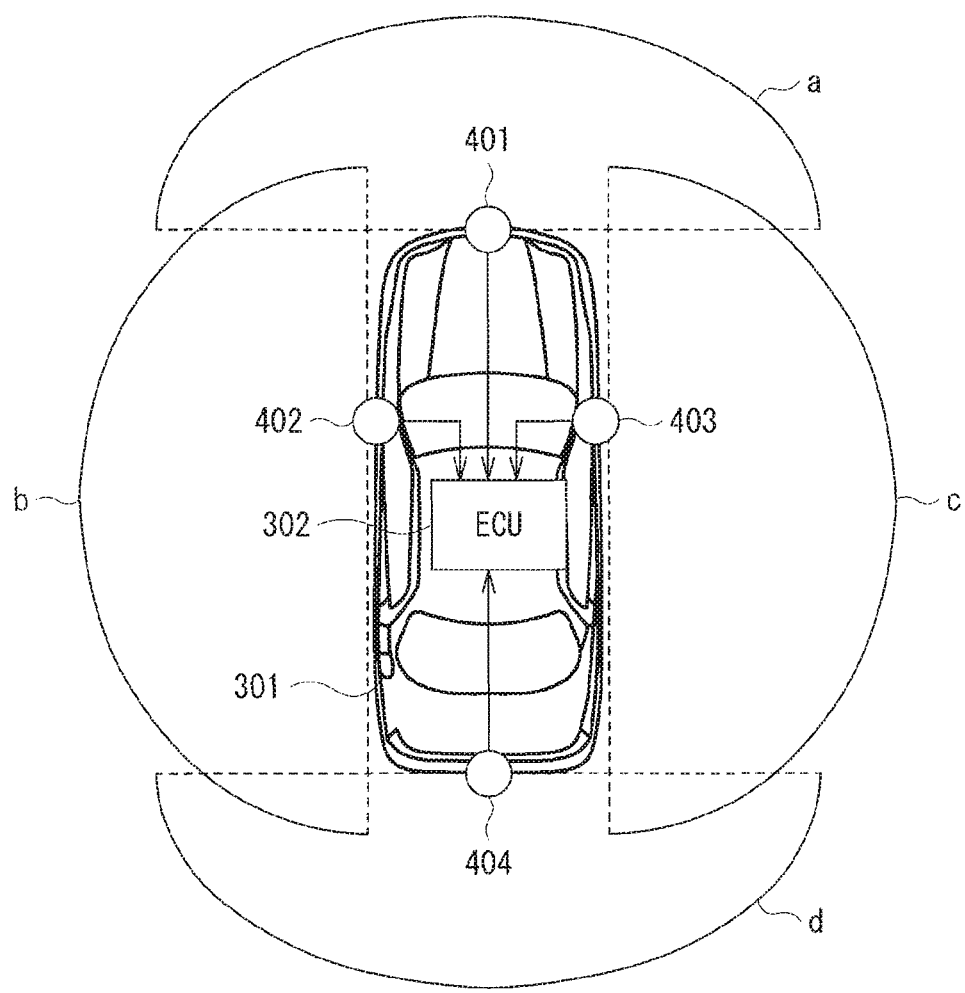

[ FIG. 26 ]
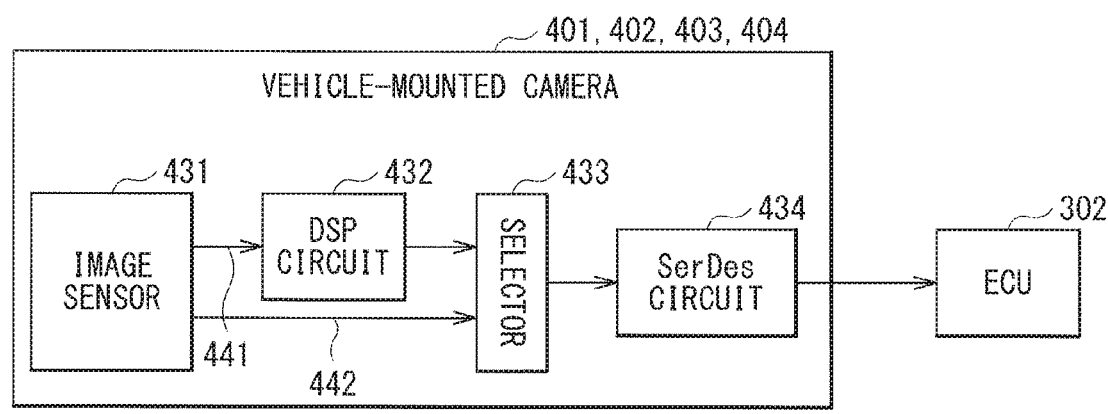

RECEPTION DEVICE, TRANSMISSION DEVICE, COMMUNICATION SYSTEM, SIGNAL RECEPTION METHOD, SIGNAL TRANSMISSION METHOD, AND COMMUNICATION METHOD

CROSS REFERENCE TO RELATED APPLICATIONS

This application claims the benefit of Japanese Priority Patent Application JP 2016-084406 filed Apr. 20, 2016, the entire contents of each which is incorporated herein by reference.

TECHNICAL FIELD

The present disclosure relates to a reception device, a transmission device, a communication system, a signal reception method, a signal transmission method, and a communication method that each are applied to transmission of a data signal and a clock signal.

BACKGROUND ART

In recent years, in association with increasing capacity of image data handled by mobile devices such as smartphones and camera devices, higher speed and lower power consumption of data transmission in a device or between different devices have been in demand. In order to meet such demands, standardization of high-speed interface specifications has been promoted. Examples of the high-speed interface specifications may include the C-PHY specification and the D-PHY specification that have been developed as connection interface specifications for mobile devices and camera devices by the Mobile Industry Processor Interface (MIPI) alliance. The C-PHY specification and the D-PHY specification are interface specifications for communication protocol physical layers (PHY). Moreover, a display serial interface (DSI) for mobile device display or a camera serial interface (CIS) for camera device is provided as an upper protocol layer of the C-PHY specification or the D-PHY specification.

CITATION LIST

Patent Literature

PTL 1: Japanese Unexamined Patent Application Publication (Published Japanese Translation of PCT Application) No. JP 2014-522204

SUMMARY

Technical Problem

In the above-described specifications such as the D-PHY specification, it may be expected that a plurality of communication modes will be mixed in each of a blanking period and a substantial data signal transmission period in future. Accordingly, it may be necessary to discriminate the plurality of communication modes.

It is therefore desirable to provide a reception device, a transmission device, a communication system, a signal reception method, a signal transmission method, and a communication method that each make it possible to easily discriminate a plurality of communication modes.

Solution to Problem

A reception device according to an embodiment of the present disclosure includes a data signal receiver circuit, a clock signal receiver circuit, and a discrimination circuit. The data signal receiver circuit receives a data signal through a data signal line, and receives a data blanking signal through the data signal line in a blanking period of the data signal. The clock signal receiver circuit that receives a clock signal and a clock blanking signal through a clock signal line, the clock blanking signal outputted in synchronization with the blanking period of the data signal. The discrimination circuit discriminates communication modes on a basis of one or both of a signal value of the data blanking signal and a signal value of the clock blanking signal.

A transmission device according to an embodiment of the present disclosure includes a data signal transmitter circuit, a clock signal transmitter circuit, and a blanking controller. The data signal transmitter circuit outputs a data signal to a data signal line, and outputs a data blanking signal through the data signal line in a blanking period of the data signal. The clock signal transmitter circuit that outputs a clock signal to a clock signal line, and outputs a clock blanking signal, in place of the clock signal, in synchronization with the blanking period of the data signal. The blanking controller controls one or both of a signal value of the data blanking signal and a signal value of the clock blanking signal to a value that enables discrimination of communication modes.

A communication system according to an embodiment of the present disclosure includes a transmission device and a reception device. The transmission device includes a data signal transmitter circuit, a clock signal transmitter circuit and a blanking controller. The data signal transmitter circuit outputs a data signal to a data signal line, and outputs a data blanking signal through the data signal line in a blanking period of the data signal. The clock signal transmitter circuit outputs a clock signal to a clock signal line, and outputs a clock blanking signal, in place of the clock signal, in synchronization with the blanking period of the data signal. The blanking controller controls one or both of a signal value of the data blanking signal and a signal value of the clock blanking signal to a value that enables discrimination of communication modes. The reception device includes a data signal receiver, a clock signal receiver circuit, and a discrimination circuit. The data signal receiver circuit receives the data signal and the data blanking signal through the data signal line. The clock signal receiver circuit receives the clock signal and the clock blanking signal through the clock signal line. The discrimination circuit discriminates the communication modes on a basis of one or both of the signal value of the data blanking signal and the signal value of the clock blanking signal.

A signal reception method according to an embodiment of the present disclosure includes: receiving a data signal through a data signal line, and receiving a data blanking signal through the data signal line in a blanking period of the data signal; receiving a clock signal and a clock blanking signal through a clock signal line, the clock blanking signal outputted in synchronization with the blanking period of the data signal; and discriminating communication modes on a basis of one or both of a signal value of the data blanking signal and a signal value of the clock blanking signal.

A signal transmission method according to an embodiment of the present disclosure includes: outputting a data signal to a data signal line, and outputting a data blanking signal through the data signal line in a blanking period of the data signal; outputting a clock signal to a clock signal line, and outputting a clock blanking signal, in place of the clock signal, in synchronization with the blanking period of the data signal; and controlling one or both of a signal value of the data blanking signal and a signal value of the clock blanking signal to a value that enables discrimination of communication modes.

A communication method according to an embodiment of the present disclosure includes: outputting a data signal to a data signal line, and outputting a data blanking signal through the data signal line in a blanking period of the data signal; outputting a clock signal to a clock signal line, and outputting a clock blanking signal, in place of the clock signal, in synchronization with the blanking period of the data signal; controlling one or both of a signal value of the data blanking signal and a signal value of the clock blanking signal to a value that enables discrimination of a communication mode; receiving the data signal and the data blanking signal through the data signal line; receiving the clock signal and the clock blanking signal through the clock signal line; and discriminating the communication modes on a basis of one or both of the signal value of the data blanking signal and the signal value of the clock blanking signal.

In the reception device or the communication system according to the embodiment of the present disclosure, or the signal reception method or the communication method according to the embodiment of the present disclosure, the communication modes are discriminated on the basis of one or both of the signal value of the data blanking signal and the signal value of the clock blanking signal.

In the transmission device or the communication system according to the embodiment of the present disclosure or the signal transmission method or the communication method according to the embodiment of the present disclosure, one or both of the signal value of the data blanking signal and the signal value of the clock blanking signal are controlled to a value that enables discrimination of the communication modes.

Advantageous Effects of Invention

According to the reception device, the communication system, the signal reception mode, and the communication method of the respective embodiments of the present disclosure, the communication modes are discriminated on the basis of one or both of signal value of the data blanking signal and the signal value of the clock blanking signal, which makes it possible to easily discriminate a plurality of communication modes.

According to the transmission device, the communication system, the signal transmission method, and the communication method of the respective embodiments of the present disclosure, one or both of the signal value of the data blanking signal and the signal value of the clock blanking signal are controlled to a value that enables discrimination of the communication modes, which makes it possible to easily discriminate a plurality of communication modes.

Note that effects described here are non-limiting. Effects achieved by the technology may be one or more of effects described in the disclosure.

It is to be understood that both the foregoing general description and the following detailed description are exemplary, and are provided to provide further explanation of the technology as claimed.

BRIEF DESCRIPTION OF DRAWINGS

The accompanying drawings are included to provide a further understanding of the technology, and are incorporated in and constitute a part of this specification. The drawings illustrate embodiments and, together with the specification, serve to explain the principles of the technology.

FIG. 1 is a block diagram illustrating an outline of a communication system that transmits a data signal and a clock signal.

FIG. 2 is a block diagram illustrating a configuration example of a communication system according to a comparative example that implements the communication system illustrated in FIG. 1.

FIG. 3 is a circuit diagram illustrating a specific circuit configuration example of the communication system illustrated in FIG. 2.

FIG. 4 is an explanatory diagram illustrating an example of respective signal waveforms to be transmitted on a clock lane and a data lane in the communication system illustrated in FIG. 2.

FIG. 5 is a block diagram illustrating an outline of a communication system according to a first embodiment of the present disclosure.

FIG. 6 is a circuit diagram illustrating a specific circuit configuration example of the communication system according to the first embodiment.

FIG. 7 is an explanatory diagram illustrating an example of a communication mode (a blanking mode) in a blanking period.

FIG. 8 is an explanatory diagram illustrating an example of a frame structure of image data.

FIG. 9 is an explanatory diagram illustrating a first example of respective signal waveforms to be transmitted on a clock lane and a data lane in the communication system according to the first embodiment.

FIG. 10 is an explanatory diagram illustrating a second example of respective waveforms to be transmitted on the clock lane and the data lane in the communication system according to the first embodiment.

FIG. 11 is an explanatory diagram of a differential signal value.

FIG. 12 is a block diagram illustrating an outline of a communication system according to a second embodiment.

FIG. 13 is a block diagram illustrating a specific application example of the communication system according to the second embodiment.

FIG. 14 is a flow chart illustrating an example of a data transmission process in the application example illustrated in FIG. 13.

FIG. 15 is an explanatory diagram illustrating an example of data signal communication modes (data transmission modes).

FIG. 16 is an explanatory diagram illustrating a first example of respective waveforms to be transmitted on a clock lane and a data lane in a communication system according to a third embodiment.

FIG. 17 is an explanatory diagram illustrating an example of a method of discriminating communication modes in the first example illustrated in FIG. 16.

FIG. 18 is an explanatory diagram illustrating a second example of respective waveforms to be transmitted on the clock lane and the data lane in the communication system according to the third embodiment.

FIG. 19 is an explanatory diagram illustrating an example of a method of discriminating communication modes in the second example illustrated in FIG. 18.

FIG. 20 is an explanatory diagram illustrating a third example of respective waveforms to be transmitted on the clock lane and the data lane in the communication system according to the third embodiment.

FIG. 21 is an explanatory diagram illustrating an example of a method of discriminating communication modes in the third example illustrated in FIG. 20.

FIG. 22 is a perspective view of an example of an appearance configuration of a smartphone to which any of the communication systems according to the respective embodiments is applied.

FIG. 23 is a block diagram illustrating a configuration example of an application processor to which any of the communication systems according to the respective embodiments is applied.

FIG. 24 is a block diagram illustrating a configuration example of an image sensor to which any of the communication systems according to the respective embodiments is applied.

FIG. 25 is an explanatory diagram illustrating an installation example of a vehicle-mounted camera to which any of the communication systems according to the respective embodiments is applied.

FIG. 26 is a block diagram illustrating a configuration example of the vehicle-mounted camera to which any of the communication systems according to the respective embodiments is applied.

DESCRIPTION OF EMBODIMENTS

Some embodiments of the present disclosure are described in detail below with reference to the accompanying drawings. It is to be noted that description is given in the following order.

0. Communication System Using LP Signal and HS Differential Signal (Comparative example) (FIGS. 1 to 4)
1. First Embodiment (Communication system having a blanking mode discriminating function and using only an HS differential signal) (FIGS. 5 to 11)
2. Second Embodiment (Communication system that enables switching between an LP signal and an HS differential signal) (FIGS. 12 to 14)
3. Third Embodiment (Communication system having a data transmission mode discriminating function) (FIGS. 16 to 21)
4. Application Examples
4.1 First Application Example (FIGS. 22 to 24)
4.2 Second Application Example (FIGS. 25 and 26)
5. Other Embodiments

0. COMMUNICATION SYSTEM USING LP SIGNAL AND HS DIFFERENTIAL SIGNAL

In general, in the C-PHY specification and the D-PHY specification, a high speed (HS) differential signal is used for substantial data signal transmission. Moreover, a low power (LP) signal is used for blanking periods of a clock signal and a data signal. The HS differential signal and the LP signal are transmitted on a common transmission path. For example, in the D-PHY specification, one transmission path (clock lane) where the clock signal is transmitted and one or more transmission paths (data lanes) where the data signal is transmitted may be provided. A signal transmission period on each of the clock lane and the data lane includes a period in which transmission using the HS differential signal is performed and a period in which transmission using the LP signal is performed. On each of the clock lane and the data lane, the HS differential signal and the LP signal are transmitted on the common transmission path. However, the LP signal is not a differential signal but a single-ended signal, and is different in voltage value necessary for signal transmission from the HS differential signal. Hence, a circuit for transmission and reception of the HS differential signal and a circuit for transmission and reception of the LP signal are necessary independently.

First, description is given of an outline of a communication system using the LP signal and the HS differential signal as a comparative example before description of communication systems according to embodiments of the present disclosure.

FIG. 1 illustrates an outline of a communication system supporting a communication interface by, for example, the C-PHY specification or the D-PHY specification. The communication system illustrated in FIG. 1 includes a transmitter TX and a receiver RX. Moreover, the communication system includes a clock lane CL and a data lane DL that are provided across the transmitter TX and the receiver RX. The clock lane CL allows a clock signal to be transmitted thereon. The data lane DL allows, for example, a data signal such as image data to be transmitted thereon. It is to be noted that FIG. 1 illustrates an example in which four data lanes LD1, DL2, DL3, and DL4 are provided as the data lanes DL; however, the number of data lanes is not limited thereto, and only one data lane DL1 may be provided.

The transmitter TX includes a transmission digital circuit TX-DIGITAL and a transmission analog circuit TX-ANALOG. For example, a 16-bit or 8-bit parallel signal may be transmitted between the transmission digital circuit TX-DIGITAL and the transmission analog circuit TX-ANALOG.

The receiver RX includes a reception digital circuit RX-DIGITAL and a reception analog circuit RX-ANALOG. For example, a 16-bit or 8-bit parallel signal may be transmitted between the reception analog circuit RX-ANALOG and the reception digital circuit RX-DIGITAL on each of the data lanes DL1, DL2, DL3, and DL4. For example, a 2-bit serial signal may be transmitted between the reception analog circuit RX-ANALOG and the reception digital circuit RX-DIGITAL on the clock lane CL.

The transmission analog circuit TX-ANALOG and the reception analog circuit RX-ANALOG are coupled to each other by a clock signal line 30 on the clock lane CL. The clock signal line 30 allows a differential clock signal to be transmitted therethrough. The transmission analog circuit TX-ANALOG and the reception analog circuit RX-ANALOG are coupled to each other by data signal lines 31, 32, 33, and 34 on the data lanes DL1, DL2, DL3, and DL4, respectively. Each of the data signal lines 31, 32, 33, and 34A allows a differential data signal to be transmitted therethrough. Each of the clock signal line 30 and the data signal lines 31, 32, 33, and 34 includes a pair of a positive signal line Dp and a negative signal line Dn through which a differential signal is transmitted. For example, a 2-bit serial signal may be transmitted through each of the clock signal line 30 and the data signal lines 31, 32, 33, and 34.

FIG. 2 illustrates a configuration example of a communication system according to a comparative example that implements the communication system illustrated in FIG. 1. It is to be noted that FIG. 2 illustrates only one data lane DL1 as the data lane DL in FIG. 1; however, the other data lanes DL2, DL3, and DL4 may have a configuration substantially similar to that of the data lane DL1.

The communication system according to this comparative example includes a transmitter 101 and a receiver 102. The transmitter 101 and the receiver 102 respectively correspond to the transmitter TX and the receiver RX in FIG. 1.

On the clock lane CL, the transmitter 101 includes a CL-HS circuit 111 that processes the HS differential signal and a CL-LP circuit 112 that processes the LP signal. On the data lane DL1, the transmitter 101 includes a DL-HS circuit 113 that processes the HS differential signal and a DL-LP circuit 114 that processes the LP signal.

On the clock lane CL, the receiver 102 includes a CL-HS circuit 121 that processes the HS differential signal and a CL-LP circuit 122 that processes the LP signal. On the data lane DL1, the receiver 102 includes a DL-HS circuit 123 that processes the HS differential signal and a DL-LP circuit 124 that processes the LP signal.

FIG. 3 illustrates a specific circuit configuration example of the communication system according to the comparative example illustrated in FIG. 2. Moreover, FIG. 4 illustrates an example of respective signal waveforms to be transmitted on the clock lane CL and the data lane DL1 in the communication system according to the comparative example illustrated in FIG. 2.

In the communication system according to the comparative example, a status of a signal to be outputted from the transmitter 101 to the clock signal line 30 on the clock lane CL has a high speed state (HSP) period and a low power state (LPS) period, as illustrated in FIG. 4. In the HSP period, the signal is in a state of being transmitted in the form of the HS differential signal. In the LPS period, the signal is in a state of being transmitted in the form of the LP signal. A substantial clock signal is outputted in the form of the HS differential signal in the HPS period.

Likewise, a status of a signal to be outputted from the transmitter 101 to the data signal line 31 on the data lane CL has a high speed state (HSP) period and a low power state (LPS) period. In the HSP period, the signal is in a state of being transmitted in the form of the HS differential signal. In the LPS period, the signal is in a state of being transmitted in the form of the LP signal. A substantial data signal is outputted in the form of the HS differential signal in the HPS period. It is to be noted that a substantial data signal portion is represented by "HST". Moreover, the HPS period may include, for example, a TRAIL period $T_{HS\text{-}TRAIL}$ and a SYNC (synchronization) period $T_{HS\text{-}SYNC}$. A blanking period not including the substantial data signal portion is included in the LPS period. The substantial data signal may be outputted in a byte unit, for example.

The communication system includes a crystal oscillator (XTAL) 82, a PLL circuit 81, and a crystal oscillator (XTAL) 83, as illustrated in FIG. 3. The crystal oscillator (XTAL) 82 and the PPL circuit 81 each supply the clock signal to respective circuit sections in the transmitter 101. The crystal oscillator (XTAL) 83 supplies the clock signal to respective circuit sections in the receiver 102.

The CL-HS circuit 111 includes an HS state machine (HS FSM) 51, a selector 52, a parallel-serial (PS) conversion circuit 53, a clock frequency divider (DIV) 54, and an HS driver (HS DRV) 55. The selector 52 selectively outputs a Toggle signal, a signal with a value of 0 (ALL0), and a signal with a value of 1 (ALL1). The Toggle signal may be an 8-bit clock signal (1010_1010), for example.

The CL-LP circuit 112 includes an LP state machine (LP FSM) 41, an LP encoder (LP ENC) 42, and an LP driver (LP DRV) 43. A clock lane control signal is inputted to the LP state machine 41.

The DL-HS circuit 113 includes an HS state machine (HS FSM) 71, a selector 72, a parallel-serial (PS) conversion circuit 73, and an HS driver (HS DRV) 74. A data transmission ready signal TxReadyHS is outputted from the HS state machine 71. The selector 72 selectively outputs transmission data TxDataHS, a synchronization code signal SYNC, the signal with a value of 0 (ALL0), and the signal with a value of 1 (ALL1).

The DL-LP circuit 114 includes an LP state machine (LP FSM) 61, an LP encoder (LP ENC) 62, and an LP driver (LP DRV) 63. A data transmission request signal TxRequestHS is inputted to the LP state machine 61.

It is to be noted that the LP driver 43, the HS driver 55, the LP driver 63, and the HS driver 74 in the transmitter 101 correspond to the transmission analog circuit TX-ANALOG in FIG. 1.

The CL-HS circuit 121 includes a termination circuit (TERM) 56 serving as a clock signal termination circuit, an HS receiver (HS RCV) 57, and a clock frequency divider (DIV) 58. The termination circuit 56 includes a terminator.

The CL-LP circuit 122 includes an LP receiver (LP RCV) 44, an LP decoder (LP DEC) 45, and an LP state machine (LP FSM) 46. The LP state machine 46 outputs a status signal of the clock lane CL.

The DL-HS circuit 123 includes a termination circuit (TERM) 75 serving as a data signal termination circuit, an HS receiver (HS RCV) 76, a clock frequency divider (DIV) 77, and a word alignment correction circuit (ALN) 78. The termination circuit 75 includes a terminator. The word alignment correction circuit (ALN) 78 outputs a reception synchronization signal RxSyncHS, a reception valid signal RxValidHS, and reception data RxDataHS.

The DL-LP circuit 124 includes an LP receiver (LP RCV) 64, an LP decoder (LP DEC) 65, and an LP state machine (LP FSM) 66. The LP state machine 66 outputs a reception active signal RxActiveHS.

It is to be noted that mainly the LP receiver 44, the termination circuit 56, the HS receiver 57, the LP receiver 64, the termination circuit 75, and the HS receiver 76 in the receiver 102 correspond to the reception analog circuit RX-ANALOG in FIG. 1.

1. FIRST EMBODIMENT

Next, description is given of a first embodiment of the present disclosure. Hereinafter, description of configurations and workings substantially similar to those in the foregoing comparative example is omitted.

FIG. 5 illustrates an outline of a communication system according to the first embodiment of the present disclosure that implements the communication system illustrated in FIG. 1. FIG. 6 illustrates a specific circuit configuration example of the communication system illustrated in FIG. 5. It is to be noted that FIG. 5 and other drawings illustrate only one data lane DL1 as the data lane DL in FIG. 1; however, the other data lanes DL2, DL3, and DL4 may have a configuration substantially similar to that of the data lane DL1.

The communication system according to the present embodiment includes a transmitter 1 (a transmission device) and a receiver 2 (a reception device). The transmitter 1 and the receiver 2 respectively correspond to the transmitter TX and the receiver RX in FIG. 1. The transmitter 1 includes a blanking controller 20.

The communication system according to the comparative example illustrated in FIGS. 2 to 4 uses a communication mode in which an LP signal having a voltage of about 1.3 V is outputted in the blanking periods of the clock signal and the data signal. However, it has become difficult to keep this voltage in association with advances in semiconductor process.

Accordingly, in the communication system according to the present embodiment, on the clock lane CL, all signals to be outputted from the transmitter 1 to the clock signal line 30 including the blanking period are HS differential signals only. Likewise, on the data lane DL1, all signals to be outputted from the transmitter 1 to the data signal line 31 including the blanking period are HS differential signals only.

Moreover, the communication system according to the present embodiment has a plurality of communication modes (blanking modes) in the blanking period.

FIG. 7 illustrates an example of blanking modes in the present embodiment. In the present embodiment, examples of the blanking modes may include a first blanking mode in which a transmission period is relatively short and a second blanking mode in which a transmission period is relatively long.

The first blanking mode is a communication (Latency Reduction Transport Efficiency: LRTE) mode in which a blanking interval is minimized. In the LRTE mode, the transmission period has a fixed length. Moreover, the LRTE mode is a mode in which termination control is not performed (on-off switching of a terminator is not performed).

The second blanking mode is a communication (Alternate LP: ALP) mode suitable for a long blanking period. In the ALP mode, the transmission period has a variable length. Moreover, the ALP mode is a mode in which it is possible to perform termination control (on-off switching of the terminator is possible).

FIG. 8 illustrates an example of a frame structure of image data to be transmitted in the communication system according to the present embodiment. FIG. 8 illustrates a frame structure of two frames of image data. A header of the frame is referred to as "FS (frame start)", and a footer of the frame is referred to as "FE (frame end)". An interval between the two frames is a frame blanking period (vertical blanking period) Vb. In one frame, a header of one horizontal period is referred to as "packet header", and a footer of the one horizontal period is referred to as "PF (packet footer)".

A data signal may be inserted into a horizontal blanking period Hb. Examples of the data signal may include a phase difference detection data PDAF (Phase Detection Auto-Focus) used for phase-difference auto-focusing. In the horizontal blanking period Hb, a period Hb1 excluding a period Hb2 into which the data signal such as PDAF (Phase Detection Auto-Focus) is inserted is a substantial horizontal blanking period. In this case, the horizontal blanking period Hb1 is extremely short. Accordingly, in the communication system according to the present embodiment, the first blanking mode (the LRTE mode) is suitable as the blanking mode for communication in the horizontal blanking period Hb1. Moreover, the second blanking mode (the ALP mode) is suitable for communication in the vertical blanking period Vb.

In a case in which a plurality of communication modes are mixed in the blanking period in such a manner, it is necessary to discriminate the plurality of communication modes in the receiver 2. One possible discrimination technique is to measure a length of a period in which the clock signal is stopped. However, in this case, it is necessary to prepare a counter in the receiver 2.

Accordingly, the present embodiment makes it possible to discriminate the plurality of communication mode without using the counter. In the present embodiment, in the transmitter 1, the blanking controller 20 may control, depending on the communication modes, a signal value of a data blanking signal and a signal value of a clock blanking signal to, for example, values that enable discrimination of the communication modes as illustrated in FIGS. 9 and 10 to be described later. Moreover, in the receiver 2, a clock state discrimination circuit 59 (FIG. 6) to be described later may discriminate the communication modes with reference to, for example, values illustrated in FIGS. 9 and 10 to be described later.

FIG. 9 illustrates a first example of respective signal waveforms to be transmitted on the clock lane CL and the data lane DL1 in the communication system according to the present embodiment. FIG. 9 illustrates an example in which the communication mode in the blanking period is the first blanking mode (the LRTE mode).

FIG. 10 illustrates a second example of respective signal waveforms to be transmitted on the clock lane CL and the data lane DL1 in the communication system according to the present embodiment. FIG. 10 illustrates an example in which the communication mode in the blanking period is the second blanking mode (the ALP mode).

It is to be noted that a substantial data signal portion in FIGS. 9 and 10 is referred to as "HST". Periods before and after a substantial data signal may include a SYNC (synchronization) period $T_{HS\text{-}SYNC}$ and a TRAIL period $T_{HS\text{-}TRAIL}$.

As illustrated in FIG. 6, the communication system according to the present embodiment may include the crystal oscillator (XTAL) 82, the PLL circuit 81, the crystal oscillator (XTAL) 83, and a PPL circuit 84. The crystal oscillator (XTAL) 82 and the PLL circuit 81 each supply the clock signal to respective circuit portions in the transmitter 1. The crystal oscillator (XTAL) 83 and the PLL circuit 84 each supply the clock signal to respective circuit portions in the receiver 2.

(Specific Configuration Example of Transmitter 1)

On the clock lane CL, the transmitter 1 may include a CL-HS circuit 11 that processes the HS differential signal. On the data lane DL1, the transmitter 1 may include a DL-HS circuit 13 that processes the HS differential signal.

The CL-HS circuit 11 may be a differential clock signal transmitter circuit that outputs the clock signal and the HS differential signal as a clock blanking signal to the clock signal line 30. The DL-HS circuit 13 may be a differential data signal transmitter circuit that outputs the data signal and the HS differential signal as a data blanking signal to the data signal line 31.

The transmitter 1 according to the present embodiment may not include circuits corresponding to the CL-LP circuit 112 and the DL-LP circuit 114 that each process the LP signal in the foregoing comparative example.

The CL-HS circuit 11 may include a circuit substantially similar to the CL-HS circuit 111 in FIG. 3, as illustrated in FIG. 6. More specifically, the CL-HS circuit 11 may include the HS state machine (HS FSM) 51, the selector 52, the parallel-serial (PS) conversion circuit 53, the clock frequency divider (DIV) 54, and the HS driver (HS DRV) 55. The selector 52 may selectively output the Toggle signal, the signal with a value of 0 (ALL0), and the signal with a value of 1 (ALL1). The Toggle signal may be an 8-bit clock signal (1010_1010), for example. In the present embodiment, the clock lane control signal and the data transmission request signal TxRequestHS may be inputted into the HS state machine 51.

The DL-HS circuit 13 may include circuits substantially similar to the DL-HS circuit 113 in FIG. 3, as illustrated in FIG. 6. More specifically, the DL-HS circuit 13 may include the HS state machine (HS FSM) 71, the selector 72, the parallel-serial (PS) conversion circuit 73, and the HS driver (HS DRV) 74. The HS state machine 71 may output the data transmission ready signal TxReadyHS. The selector 72 may selectively output the transmission data TxDataHS, the synchronization code signal SYNC, the signal with a value of 0 (ALL0), and the signal with a value of 1 (ALL1).

The blanking controller 20 may include the HS state machine 51 and the HS state machine 71, as illustrated in FIG. 6.

(Example of Mode Control Operation in Transmitter 1)

In a case in which communication by the first blanking mode in FIG. 9 is performed, the blanking controller 20 may control the DL-HS circuit 13 so as to output, for example, a data blanking signal with a value of 1, in place of the data signal from the DL-HS circuit 13, from the DL-HS circuit 13 to the data signal line 31 in synchronization with start time of a blanking period of the data signal.

Moreover, in the case in which communication by the first blanking mode is performed, the blanking controller 20 may control the CL-HS circuit 11 so as to output, for example, a differential blanking signal, in place of the clock signal, from the CL-HS circuit 11 to the clock signal line 30 in synchronization with the start time of the blanking period of the data signal throughout a predetermined period or longer. In the differential blanking signal, a clock blanking signal with a value of 0 may continue. The predetermined period herein is a period that is longer than a clock cycle of the clock signal. The clock blanking signal is a signal continuously having a signal value of 0 throughout a period longer than the clock cycle of the clock signal, which makes it possible to detect a signal change in the clock state discrimination circuit 59 of the receiver 2, thereby detecting that the blanking period has started.

Moreover, in the case in which communication by the first blanking mode is performed, the blanking controller 20 may control the CL-HS circuit 11 so as to output the clock signal, in place of the clock blanking signal, from the CL-HS circuit 11 to the clock signal line 30 in synchronization with end time of the blanking period of the data signal throughout a predetermined period or longer. Outputting the clock signal, in place of the clock blanking signal, throughout the predetermined period or longer makes it possible to detect a signal change in the clock state discrimination circuit 59 of the receiver 2, thereby detecting that the blanking period has ended and transfer of the data signal is to start.

In contrast, in a case in which communication by the second blanking mode in FIG. 10 is performed, the blanking controller 20 may control the DL-HS circuit 13 so as to output a data blanking signal with a value of 0, in place of the data signal, from the DL-HS circuit 13 to the data signal line 31 in synchronization with the start time of the blanking period of the data signal.

Moreover, in the case in which communication by the second blanking mode is performed, the blanking controller 20 may control the CL-HS circuit 11 so as to output, for example, a differential blanking signal, in place of the clock signal, from the CL-HS circuit 11 to the clock signal line 30 in synchronization with the start time of the blanking period of the data signal throughout a predetermined period or longer. In the differential blanking signal, a clock blanking signal with a value of 0 may continue. The predetermined period herein is a period longer than the clock cycle of the clock signal. The clock blanking signal is a signal continuously having a signal value of 0 throughout a period longer than the clock cycle of the clock signal, which makes it possible to detect a signal change in the clock state discrimination circuit 59 of the receiver 2, thereby detecting that the blanking period has started.

Further, in the case in which communication by the second blanking mode is performed, the blanking controller 20 may control the CL-HS circuit 11 so as to output, for example, a clock blanking signal with a value of 1, in place of the clock blanking signal with a value of 0, from the CL-HS circuit 11 to the clock signal line 30 in synchronization with the end time of the blanking period of the data signal throughout a predetermined period or longer. Outputting the clock blanking signal with a value of 1, in place of the clock blanking signal with a value of 0, throughout the predetermined period or longer makes it possible to detect a signal change in the clock state discrimination circuit 59 of the receiver 2, thereby detecting that the blanking period has ended and transfer of the data signal is to start.

As with the examples illustrated in FIGS. 9 and 10, the value of the data blanking signal at the start of the blanking period of the data signal is different between the first blanking mode and the second blanking mode, which makes it possible to discriminate the communication modes in the clock state discrimination circuit 59 of the receiver 2.

It is to be noted that the values of the clock blanking signal and the data blanking signal illustrated in FIGS. 9 and 10 are merely examples, and different values from the values in the examples in FIGS. 9 and 10 may be used.

FIG. 11 illustrates an example of a value of a differential signal. The clock blanking signal with a value of 0 and the data blanking signal with a value of 0 may be differential signals with a differential of 0 (Differential-0). Moreover, the clock blanking signal with a value of 1 and the data blanking signal with a value of 1 may be differential signals with a differential of 1 (Differential-1). More specifically, as illustrated in FIG. 11, the differential signal with a value of 0 may be a differential signal in which a voltage level of a positive signal line Dp and a voltage level of a negative signal line Dn on a transmission line of the differential signal are low and high, respectively. Moreover, the differential signal with a value of 1 may be a differential signal in which the voltage level of the positive signal line Dp and the voltage level of the negative signal line Dn on the transmission line of the differential signal are high and low, respectively.

(Specific Configuration Example of Receiver 2)

On the clock lane CL, the receiver 2 may include a CL-HS circuit 21 that processes the HS differential signal. On the data lane DL1, the receiver 2 may include a DL-HS circuit 23 that processes the HS differential signal.

The DL-HS circuit 23 may be a differential data signal receiver circuit that receives the data signal and the HS differential signal as a data blanking signal through the data signal line 31. The CL-HS circuit 21 may be a differential clock signal receiver circuit that receives the clock signal and the HS differential signal as a clock blanking signal through the clock signal line 30.

The receiver 2 according to the present embodiment may not include circuits corresponding to the CL-LP circuit 122 and the DL-LP circuit 124 that each process the LP signal in the foregoing comparative example.

The DL-HS circuit 23 may include a circuit substantially similar to the DL-HS circuit 123 in FIG. 3, as illustrated in FIG. 6. More specifically, the DL-HS circuit 23 may include the termination circuit (TERM) 75 serving as a data signal termination circuit coupled to the data signal line 31, the HS receiver (HS RCV) 76, the clock frequency divider (DIV) 77, and the word alignment correction circuit (ALN) 78. The termination circuit 75 may include a terminator. The word alignment correction circuit (ALN) 78 may output the reception synchronization signal RxSyncHS, the reception valid signal RxValidHS, and the reception data RxDataHS.

The CL-HS circuit 21 may include a circuit substantially similar to the CL-HS circuit 121 in FIG. 3, as illustrated in FIG. 6. More specifically, the CL-HS circuit 21 may include the termination circuit (TERM) 56 serving as a clock signal termination circuit coupled to the clock signal line 30, the HS receiver (HS RCV) 57, and the clock frequency divider (DIV) 58. The termination circuit 56 may include a terminator.

The CL-HS circuit 21 may further include the clock (CL) state discrimination circuit 59. The clock signal and the clock blanking signal from the CL-HS circuit 11 of the transmitter 1 may be inputted to the clock state discrimination circuit 59 through the HS receiver 57. Moreover, the data blanking signal from the DL-HS circuit 13 of the transmitter 1 may be inputted to the clock state discrimination circuit 59 through the HS receiver 76.

(Example of Mode Discrimination in Receiver 2)

The clock state discrimination circuit 59 may discriminate the blanking modes with reference to, for example, the value of the data blanking signal at the start of the blanking period of the data signal. For example, in a case in which the value of the data blanking signal is 1 as with the example in FIG. 9, the clock state discrimination circuit 59 may discriminate that the blanking mode is the first blanking mode. Moreover, for example, in a case in which the value of the data blanking signal is 0 as with the example in FIG. 10, the clock state discrimination circuit 59 may discriminate that the blanking mode is the second blanking mode.

(Examples of Termination Control and Word Alignment Control in Receiver 2)

In the case of the second blanking mode as with the example in FIG. 10, the receiver 2 may perform a termination control process. The clock state discrimination circuit 59 may function as a termination control circuit. The clock state discrimination circuit 59 may perform control to cause the terminator of the data signal termination circuit (the termination circuit 75) and the terminator of the clock signal termination circuit (the termination circuit 56) to be turned off on the basis of, for example, the clock blanking signal with a value of 0. Moreover, the clock state discrimination circuit 59 may perform control to cause the terminator of the termination circuit 75 and the terminator of the termination circuit 56 to be turned on, on the basis of the clock blanking signal with a value of 1 that is outputted in synchronization with the end time of the blanking period of the data signal.

It is to be noted that voltage amplitudes of the signals in the blanking periods on the clock lane CL and the data lane DL1 are changed when the terminators are turned on or off, as illustrated in FIG. 10. Moreover, turning off the terminator in the blanking period makes it possible to reduce values of currents flowing through the clock signal line 30 and the data signal line 31.

Moreover, the clock state discrimination circuit 59 may have a function of outputting the reception active signal RxActiveHS and performing word alignment control on the word alignment correction circuit 78. The clock state discrimination circuit 59 properly detects that the blanking period is ended and transfer of the data signal starts, which makes it possible for the word alignment correction circuit 78 to perform word alignment control properly.

Effects

As described above, according to the present embodiment, the differential blanking signal in which the predetermined value continues throughout the predetermined period or longer is outputted as the clock blanking signal, in place of the clock signal, to the clock signal line 30 in synchronization with the start time of the blanking period of the data signal, which makes it possible to reduce power consumption during data transmission. Moreover, according to the present embodiment, as compared with the communication system according to the foregoing comparative example, the circuit that processes the LP signal is unnecessary, which makes it possible to reduce a circuit size.

Further, according to the present embodiment, the signal value of the data blanking signal is controlled to a value that enables discrimination of the blanking modes in the transmitter 1, and the blanking modes are discriminated on the basis of the signal value of the data blanking signal in the receiver 2. This makes it possible to easily perform discrimination of a plurality of blanking modes without using a counter for discrimination of the blanking modes in the receiver 2.

Note that the effects described in the present specification are illustrative and nonlimiting. Effects achieved by the technology may be effects other than those described in the present specification. The same applies to effects of other embodiments.

2. SECOND EMBODIMENT

Next, description is given of a second embodiment of the present disclosure. Hereinafter, description of configurations and workings substantially similar to those in the foregoing comparative example and the foregoing first embodiment is omitted.

FIG. 12 illustrates an outline of a communication system according to a second embodiment of the present disclosure. The communication system according to the present embodiment includes a transmitter 1B (a transmission device) corresponding to the transmitter TX in FIG. 1 and a receiver 2B (a reception device) corresponding to the receiver RX in FIG. 1.

In the communication system according to the foregoing first embodiment, all signals to be transmitted on the clock lane CL and the data lane DL1 including the blanking period are HS differential signals only. In contrast, the communication system according to the present embodiment may include a switching circuit that makes it possible to perform communication using the LP signal. The switching circuit makes it possible to perform switching between a mode in which communication using the HS differential signal without using the LP signal is performed and a mode in which communication using both the LP signal and the HS differential signal is performed.

In the communication system according to the present embodiment, the transmitter 1B may include the blanking controller 20 that achieve a function substantially similar to that of the communication system according to the foregoing first embodiment.

Moreover, the transmitter 1B may include the CL-HS circuit 11 that processes the HS differential signal, a CL-LP circuit 12 that processes the LP signal, a selector switch 15, and a selector 17 on the clock lane CL.

The CL-LP circuit 12 may be a first single-ended signal transmitter circuit that outputs a first signal-ended signal as the LP signal. The CL-LP circuit 12 may have a function substantially similar to that of the CL-LP circuit 112 in FIG. 2. The selector switch 15 may be a first transmission switching circuit that switches a signal output path to cause one of the CL-HS circuit 11 and the CL-LP circuit 12 to output a signal to the clock signal line 30. The selector 17 may be a circuit that causes a control signal from the blanking controller 20 to be inputted to the CL-HS circuit 11 in a mode in which communication using only the HS differential signal without using the LP signal is performed, and prevents the control signal from the blanking controller 20 from being inputted to the CL-HS circuit 11 in a mode in which communication using both the LP signal and the HS differential signal is performed.

Moreover, the transmitter 1B may include the DL-HS circuit 13 that processes the HS differential signal, the DL-LP circuit 14 that processes the LP signal, a selector switch 16, and a selector 18 on the data lane DL1.

The DL-LP circuit 14 may be a second single-ended signal transmitter circuit that outputs a second single-ended signal as the LP signal. The DL-LP circuit 14 may have a function substantially similar to that of the DL-LP circuit 114 in FIG. 2. The selector switch 16 may be a second transmission switching circuit that switches a signal output path to cause one of the DL-HS circuit 13 and the DL-LP circuit 14 to output a signal to the data signal line 31. The selector 18 may be a circuit that causes a control signal from the blanking controller 20 to be inputted to the DL-HS circuit 13 in the mode in which communication using only the HS differential signal without using the LP signal is performed, and prevents the control signal from the blanking controller 20 from being inputted to the DL-HS circuit 13 in the mode in which communication using both the LP signal and the HS differential signal is performed.

The receiver 2B may include the CL-HS circuit 21 that processes the HS differential signal, a CL-LP circuit 22 that processes the LP signal, a selector 25, a selector 27, and a selector 28. The CL-LP circuit 22 may be a first single-ended signal receiver circuit that receives the first single-ended signal as the LP signal through the clock signal line 30. The CL-LP circuit 22 may have a function substantially similar to that of the CL-LP circuit 122 in FIG. 2.

The selector 25 may be a first reception switching circuit that performs switching whether to receive the first single-ended signal as the LP signal. The selector 25 may be a circuit that prevents a signal received through the clock signal line 30 from being inputted to the CL-LP circuit 22 in the mode in which communication using only the HS differential signal without using the LP signal is performed, and causes the signal received through the clock signal line 30 to be inputted to the CL-LP circuit 22 in the mode in which communication using both the LP signal and the HS differential signal is performed. The selector 27 may be a circuit that inputs a termination control signal from the CL-HS circuit 21 to the DL-HS circuit 23 in the mode in which communication using only the HS differential signal without using the LP signal is performed, and prevents the termination control signal from the CL-HS circuit 21 from being inputted to the DL-HS circuit 23 in the mode in which communication using both the LP signal and the HS differential signal is performed. The selector 28 may be a circuit that causes a word alignment control signal from the CL-HS circuit 21 to be inputted to the DL-HS circuit 23 in the mode in which communication using only the HS differential signal without using the LP signal is performed, and prevents the word alignment control signal from the CL-HS circuit 21 from being inputted to the DL-HS circuit 23 in the mode in which communication using both the LP signal and the HS differential signal is performed.

Moreover, the receiver 2B may include the DL-HS circuit 23 that processes the HS differential signal, a DL-LP circuit 24 that processes the LP signal, and a selector 26 on the data lane DL1. The DL-LP circuit 24 may be a second single-ended signal receiver circuit that receives the second single-ended signal as an LP signal through the data signal line 31.

The selector 26 may be a second reception switching circuit that performs whether to receive the second single-ended signal as the LP signal. The selector 26 may be a circuit that prevents a signal received through the data signal line 31 from being inputted to the DL-LP circuit 24 in the mode in which communication using only the HS differential signal without using the LP signal is performed, and causes the signal received through the data signal line 31 to be inputted to the DL-LP circuit 24 in the mode in which communication using both the LP signal and the HS differential signal is performed.

FIG. 13 illustrates a specific application example of the communication system according to the present embodiment.

For example, the communication system according to the present embodiment is applicable to data transmission from an image sensor IS to an application processor AP, as illustrated in FIG. 13. The transmitter 1B may be provided in the image sensor IS. The receiver 2B may be provided in the application processor AP. The image sensor IS and the application processor AP may be coupled to each other through the clock signal line 30 and the data signal line 31. Signals may be transmitted through the clock signal line 30 and the data signal line 31 in one direction.

Moreover, the image sensor IS and the application processor AP may be coupled to each other through a bidirectional control bus 35. The control bus 35 may use an I$^2$C (Inter-Integrated Circuit) interface or an I$^3$C interface that is an extension of the I$^2$C interface.

FIG. 14 illustrates an example of a data transmission process in a device including the image sensor IS and the application processor AP illustrated in FIG. 13.

The device including the image sensor IS and the application processor AP may be powered on (step S101). The application processor AP may read a register setting of the image sensor IS with use of the control bus 35 (step S102). Thus, the application processor AP may determine whether the image sensor IS corresponds to communication without the LP signal (step S103). In other words, the application processor AP may determine whether the image sensor IS corresponds to the mode in which communication using only the HS differential signal without using the LP signal is performed or the mode in which communication using both the LP signal and the HS differential signal is performed.

In a case in which the application processor AP determines that the image sensor IS does not correspond to communication without the LP signal (step S103; N), the application processor AP may determine that the image sensor IS is in the mode in which communication using both the LP signal and the HS differential signal is performed, and may output a transmission start command signal to the image sensor IS with use of the control bus 35 (step S109). Next, the image sensor IS may start transmission of the data signal in response to the transmission start command signal (step S110).

In contrast, in a case in which the application processor AP determines that the image sensor IS corresponds to communication without the LP signal (step S103; Y), the application processor AP may transmit a setting for validating communication without the LP signal to the image sensor IS (step S104).

Next, the application processor AP may determine whether the image sensor IS corresponds to communication by the first blanking mode (the LRTE mode) with reference to the register setting of the image sensor IS (step S105). In a case in which the application processor AP determines that the image sensor IS does not correspond to communication by the first blanking mode (step S105; N), the flow of the data transmission process proceeds to a process in step S107 to be described later. In a case in which the application processor AP determines that the image sensor IS corresponds to communication by the first blanking mode (step S105; Y), the application processor AP may transmit a setting for validating communication by the first blanking mode to the image sensor IS with use of the control bus 35 (step S106).

Next, the application processor AP may determine whether the image sensor IS corresponds to communication by the second blanking mode (the ALP mode) with reference to the register setting of the image sensor IS (step S107). In a case in which the application processor AP determines that the image sensor IS does not correspond to communication by the second blanking mode (step S107; N), the application processor AP may output a transmission start command signal to the image sensor IS with use of the control bus 35 (step S109). Next, the image sensor IS may start transmission of the data signal in response to the transmission start command signal (step S110).

In contrast, in a case in which the application processor AP determines that the image sensor corresponds to communication by the second blanking mode (step S107: Y), the application processor AP may transmit a setting for validating communication by the second blanking mode to the image sensor IS with use of the control bus 35 (step S108). Next, the application processor AP may output the transmission start command signal to the image sensor IS with use of the control bus 35 (step S109). Next, the image sensor IS may start transmission of the data signal in response to the transmission start command signal (step S110).

3. THIRD EMBODIMENT

Next, description is given of a third embodiment of the present disclosure. Hereinafter, description of configurations and workings substantially similar to those in the foregoing comparative example, the foregoing first embodiment, and the foregoing second embodiment is omitted.

In the foregoing first and second embodiments, an example in which discrimination of the blanking modes is performed as discrimination of the communication modes is described; however, it is possible to discriminate communication modes (data transmission modes) of a data signal by a similar discrimination technique.

FIG. 15 illustrates an example of data transmission modes to be discriminated in the present embodiment. In the present embodiment, as the data transmission modes, for example, a first data transmission mode (a high-speed transmission mode) in which transmission speed is relatively high and a second data transmission mode (a low-speed transmission mode) in which the transmission speed is relatively low may be discriminated. The high-speed transmission mode and the low-speed transmission mode may be both modes in which a differential signal is transmitted, and may have different transmission speed, for example, by changing a voltage amplitude.

It is to be noted that a basic configuration of the communication system in the present embodiment may be substantially similar to the configuration in FIGS. 5 and 6. In the transmitter 1, the blanking controller 20 may control, depending on the communication modes, the signal value of the data blanking signal and the signal value of the clock blanking signal to, for example, values that enable discrimination of the communication modes as illustrated in FIGS. 17, 19, and 21 to be described later. Moreover, in the receiver 2, the clock state discrimination circuit 59 may discriminate the communication modes with reference to, for example, values illustrated in FIGS. 17, 19 and 21 to be described later.

(First Example of Method of Discriminating Data Transmission Modes)

FIG. 16 illustrates a first example of respective signal waveforms to be transmitted on the clock lane CL and the data lane DL1 in the communication system according to the present embodiment. FIG. 16 illustrates an example in which the communication mode in the blanking period is the first blanking mode (the LRTE mode), as with the example in FIG. 9. FIG. 17 illustrates an example of a method of discriminating the communication modes of the data signal in a case in which the communication mode in the blanking period is the first blanking mode.

The blanking controller 20 may control the DL-HS circuit 13 so as to output, for example, a data blanking signal with a value $D_{nt}0$, in place of the data signal, from the DL-HS circuit 13 to the data signal line 31 in synchronization with the start time of the blanking period of the data signal.

Moreover, the blanking controller 20 may control the CL-HS circuit 1 so as to output, in place of the clock signal, a differential blanking signal from the CL-HS circuit 11 to the clock signal line 30 in synchronization with the start time of the blanking period of the data signal throughout a predetermined period or longer. In the differential blanking signal, a clock blanking signal with a value $C_{nt}0$ may continue. The predetermined period herein is a period that is longer than the clock cycle of the clock signal. The clock blanking signal is a signal continuously having the signal value $C_{nt}0$ throughout a period longer than the clock cycle of the clock signal, which makes it possible to detect a signal change in the clock state discrimination circuit 59 of the receiver 2, thereby detecting that the blanking period has started.

Further, the blanking controller 20 may control the CL-HS circuit 11 so as to output the clock signal, in place of the clock blanking signal, from the CL-HS circuit 11 to the clock signal line 30 in synchronization with the end time of the blanking period of the data signal throughout a predetermined period or longer. Outputting the clock signal, in place of the clock blanking signal, throughout the predetermined period or longer makes it possible to detect a signal change in the clock state discrimination circuit 59 of the receiver 2, thereby detecting that the blanking period has ended and transfer of the data signal is to start.

In the receiver 2, the clock state discrimination circuit 59 may discriminate the communication modes with reference to the values as illustrated in FIG. 17, for example.

The clock state discrimination circuit 59 may discriminate that the communication mode is the high-speed transmission mode in a case of ($C_{nt}0=0$, $D_{nt}0=0$) and is the low-speed transmission mode in a case of ($C_{nt}0=1$, $D_{nt}0=1$), for example. Moreover, the clock state discrimination circuit 59 may discriminate that the communication mode in the blanking period is the first blanking mode (the LRTE mode) in a case of ($C_{nt}0=0$, $D_{nt}0=1$), for example. It is to be noted that ($C_{nt}0=1$, $D_{nt}0=0$) may be reserved value ("Reserved") that is usable for discrimination of any other communication mode in future, for example.

It is to be noted that combinations of the values illustrated in FIG. 17 and the communication modes are merely examples, and a combination other than the combinations in FIG. 17 may be adopted. Moreover, discrimination of three or more kinds of data transmission modes may be performed.

(Second Example of Method of Discriminating Data Transmission Modes)

FIG. 18 illustrates a second example of respective signal waveforms to be transmitted on the clock lane CL and the data lane DL1 in the communication system according to the present embodiment. FIG. 18 illustrates an example in which the communication mode in the blanking period is the second blanking mode (the ALP mode) as with the example in FIG. 10. FIG. 19 illustrates an example of a method of discriminating the communication modes of the data signal in a case in which the communication mode in the blanking period is the second blanking mode.

The blanking controller 20 may control the DL-HS circuit 13 so as to output, for example, a data blanking signal with a value D0, in place of the data signal, from the DL-HS circuit 13 to the data signal line 31 in synchronization with the start time of the blanking period of the data signal. Moreover, the blanking controller 20 may control the DL-HS circuit 13 so as to output, in place of the data blanking signal with the value D0, a data blanking signal with a value D1 from the DL-HS circuit 13 to the data signal line 31 in synchronization with the end time of the blanking period.

Further, the blanking controller 20 may control the CL-HS circuit 11 so as to output, in place of the clock signal, a differential blanking signal from the CL-HS circuit 11 to the clock signal line 30 in synchronization with the start time of the blanking period of the data signal throughout a predetermined period or longer. In the differential blanking signal, a clock blanking signal with a value C0 may continue. The predetermined period herein is a period that is longer than the clock cycle of the clock signal. The clock blanking signal is a signal continuously having the signal value C0 throughout a period longer than the clock cycle of the clock signal, which makes it possible to detect a signal change in the clock state discrimination circuit 59 of the receiver 2, thereby detecting that the blanking period has started.

Moreover, the blanking controller 20 may control the CL-HS circuit 11 so as to output the clock blanking signal with a value C1, in place of the clock blanking signal with the value C0, from the CL-HS circuit 11 to the clock signal line 30 in synchronization with the end time of the blanking period of the data signal throughout a predetermined period or longer. Outputting the clock blanking signal with the value C1, in place of the clock blanking signal with the value C0, throughout the predetermined period or longer makes it possible to detect a signal change in the clock state discrimination circuit 59 of the receiver 2, thereby detecting that the blanking period has ended and transfer of the data signal is to start.

In the receiver 2, the clock state discrimination circuit 59 may discriminate the communication modes with reference to the values as illustrated in FIG. 19, for example.

The clock state discrimination circuit 59 may discriminate that the communication mode is the high-speed transmission mode in a case of (C0=0, C1=1) and (D0=0, D1=0), for example. Moreover, the clock state discrimination circuit 59 may discriminate that the communication mode is the low-speed transmission mode in a case of (C0=0, C1=1) and (D0=0, D1=1), for example. It is to be noted that other values may be reserved values ("Reserved") that are usable for discrimination of other communication modes in future, for example. However, in order to perform termination control, it is necessary to change at least one of the value (C0, C1) of the clock blanking signal and the value (D0, D1) of the data blanking signal within the blanking period. Accordingly, in a case in which the termination control is performed, cases of (C0=0, C1=0) and (D0=0, D1=0), (C0=0, C1=0) and (D0=1, D1=1), (C0=1, C1=1) and (D0=0, D1=0), (C0=−1, C1=1) and (D0=1, D1=1) are not used for discrimination of the communication modes.

It is to be noted that combinations of the values illustrated in FIG. 19 and the communication modes are merely examples, and a combination other than the combinations in FIG. 19 may be adopted. Moreover, discrimination of three or more kinds of data transmission modes may be performed.

(Third Example of Method of Discriminating Data Transmission Modes)

FIG. 20 illustrates a third example of respective signal waveforms to be transmitted on the clock lane CL and the data lane DL1 in the communication system according to the present embodiment. FIG. 21 illustrates an example of a method of discriminating the communication modes in the third example illustrated in FIG. 20.

FIG. 20 illustrates an example in which transition of the communication modes takes place in order of the high-speed transmission mode, the LRTE mode, the low-speed transmission mode, and the high-speed transmission mode.

In the receiver 2, as with the second example mentioned above, the clock state discrimination circuit 59 may discriminate the communication mode with reference to the value (C0, C1) on the clock lane CL and the value (D0, D1) on the data lane DL1 as illustrated in FIG. 21, for example. It is to be noted that FIG. 21 illustrates an example of an on-off state of the terminator during mode transition.

The clock state discrimination circuit 59 may discriminate that the communication mode is changed to the high-speed transmission mode in a case of (C0=0, C1=1) and (D0=0, D1=0), for example. Moreover, the clock state discrimination circuit 59 may discriminate that the communication mode is changed to the LRTE mode in a case of (C0=0, C1=0) and (D0=1, D1=1), for example. Further, the clock state discrimination circuit 59 may discriminate that the communication mode is changed to the low-speed transmission mode in a case of (C0=0, C1=1) and (D0=0, D1=1), for example. It is to be noted that other values may be reserved values ("Reserved") that are usable for discrimination of other communication modes in future, for example.

It is to be noted that combinations of the values illustrated in FIG. 21 and the communication modes are merely examples, and combinations other than the combinations in FIG. 21 may be adopted.

4. APPLICATION EXAMPLES

Next, description is given of application examples of the communication systems described in the foregoing respective embodiments.

4.1 First Application Example

FIG. 22 illustrates an appearance of a smartphone 300 (a multifunctional mobile phone) to which any of the communication systems according to the foregoing respective embodiments is applied. Various devices are mounted in the smartphone 300. Any of the communication systems according to the foregoing respective embodiments is applied to a communication system that exchanges data between these devices.

FIG. 23 illustrates a configuration example of an application processor 310 used in the smartphone 300. The application processor 310 may include a central processing unit (CPU) 311, a memory controller 312, a power source controller 313, an external interface 314, a graphics processing unit (GPU) 315, a media processor 316, a display controller 317, and a mobile industry processor interface (MIPI) interface 318. In this example, the CPU 311, the memory controller 312, the power source controller 313, the external interface 314, the GPU 315, the media processor 316, and the display controller 317 may be coupled to a system bus 319 to allow for data exchange through the system bus 319.

The CPU 311 may be adapted to process various pieces of information handled in the smartphone 300 in accordance with a program. The memory controller 312 may be adapted to control the memory 501 used when the CPU 311 performs information processing. The power source controller 313 may be adapted to control a power source of the smartphone 300.

The external interface 314 may be an interface for communication with external devices. In this example, the external interface 314 may be coupled to a wireless communication section 502 and an image sensor 410. The wireless communication section 502 may be adapted to carry out wireless communication with mobile phone base stations. The wireless communication section 502 may include, for example, a baseband section, a radio frequency (RF) front end section, and other components. The image sensor 410 may be adapted to acquire an image, and may include, for example, a CMOS sensor.

The GPU 315 may be adapted to perform image processing. The media processor 316 may be adapted to process information such as voice, characters, and graphics. The display controller 317 may be adapted to control the display 504 through the MIPI interface 318.

The MIPI interface 318 may be adapted to transmit an image signal to the display 504. As the image signal, for example, a YUV-format signal, an RGB-format signal, or any other format signal may be used. For example, any of the communication systems according to the foregoing respective embodiments may be applied to a communication system between the MIPI interface 318 and the display 504.

FIG. 24 illustrates a configuration example of the image sensor 410. The image sensor 410 may include a sensor 411, an image signal processor (ISP) 412, a joint photographic experts group (JPEG) encoder 413, a CPU 414, a random access memory (RAM) 415, a read only memory (ROM) 416, a power source controller 417, an inter-integrated circuit (I²C) interface 418, and an MIPI interface 419. In this example, these blocks are coupled to a system bus 420 to allow for data exchange through the system bus 420.

The sensor 411 may be adapted to acquire an image, and may be configured of, for example, a CMOS sensor. The ISP 412 may be adapted to perform predetermined processing on the image acquired by the sensor 411. The JPEG encoder 413 may be adapted to encode the image processed by the ISP 412 to generate a JPEG-format image. The CPU 414 may be adapted to control respective blocks of the image sensor 410 in accordance with a program. The RAM 415 may be a memory used when the CPU 414 performs information processing. The ROM 416 may be adapted to store a program to be executed in the CPU 414. The power source controller 417 may be adapted to control a power source of the image sensor 410. The I²C interface 418 may be adapted to receive a control signal from the application processor 310. Although not illustrated, the image sensor 410 may be adapted to also receive a clock signal from the application processor 310, in addition to the control signal.

More specifically, the image sensor 410 may be configured to be operable on the basis of clock signals of various frequencies.

The MIPI interface 419 may be adapted to transmit an image signal to the application processor 310. As the image signal, for example, a YUV-format signal, an RGB-format signal, or any other format signal may be used. For example, any of the communication systems according to the foregoing respective embodiments may be applied to a communication system between the MIPI interface 419 and the application processor 310.

4.2 Second Application Example

FIG. 25 and FIG. 26 each illustrate a configuration example of a vehicle-mounted camera as an application example to an imaging device. FIG. 25 illustrates an installation example of the vehicle-mounted camera, and FIG. 26 illustrates an internal configuration example of the vehicle-mounted camera.

For example, vehicle-mounted cameras 401, 402, 403, and 404 may be respectively mounted on the front, left, right, and rear of a vehicle 301, as illustrated in FIG. 25. The vehicle-mounted cameras 401 to 404 may be coupled to an electrical control unit (ECU) 302 through an in-vehicle network.

An image capturing angle of the vehicle-mounted camera 401 mounted on the front of the vehicle 301 may be within a range indicated by "a" in FIG. 25, for example. An image capturing angle of the vehicle-mounted camera 402 may be within a range indicated by "b" in FIG. 25, for example. An image capturing angle of the vehicle-mounted camera 403 may be within a range indicated by "c" in FIG. 25, for example. An image capturing angle of the vehicle-mounted camera 404 may be within a range indicated by "d" in FIG. 25, for example. Each of the vehicle-mounted cameras 401 to 404 may output a captured image to the ECU 302. This makes it possible to capture a 360-degree (omnidirectional) image on the front, right, left, and rear of the vehicle 301 in the ECU 302.

For example, each of the vehicle-mounted cameras 401 to 404 may include an image sensor 431, a digital signal processing (DSP) circuit 432, a selector 433, and a serializer-deserializer (SerDes) circuit 434, as illustrated in FIG. 26.

The DSP circuit 432 may be adapted to perform various kinds of image signal processing on an imaging signal outputted from the image sensor 431. The SerDes circuit 434 may be adapted to perform serial-parallel conversion of a signal, and may be configured of, for example, a vehicle-mounted interface chip such as DPD-Link Ill.

The selector 433 may be adapted to select whether to output the imaging signal outputted from the image sensor 431 through the DSP circuit 432 or not through the DSP circuit 432.

Any of the communication systems according to the foregoing respective embodiments may be applied to, for example, a connection interface 441 between the image sensor 431 and the DSP circuit 432. Moreover, any of the communication systems according to the foregoing respective embodiments may be applied to, for example, a connection interface 442 between the image sensor 431 and the selector 433.

5. OTHER EMBODIMENTS

The technology achieved by the present disclosure is not limited to that described in the foregoing respective embodiments, and may be modified in a variety of ways.

The present technology may have the following configurations.

(1)
A reception device, including:
a data signal receiver circuit that receives a data signal through a data signal line, and receives a data blanking signal through the data signal line in a blanking period of the data signal;
a clock signal receiver circuit that receives a clock signal and a clock blanking signal through a clock signal line, the clock blanking signal outputted in synchronization with the blanking period of the data signal; and
a discrimination circuit that discriminates communication modes on a basis of one or both of a signal value of the data blanking signal and a signal value of the clock blanking signal.

(2)
The reception device according to (1), wherein the discrimination circuit discriminates at least communication modes in the blanking period.

(3)
The reception device according to (2), wherein the discrimination circuit discriminates, as the communication modes in the blanking period, a first blanking mode and a second blanking mode in which a transmission period is longer than a transmission period in the first blanking mode.

(4)
The reception device according to any one of (1) to (3), wherein the discrimination circuit discriminates at least communication modes of the data signal.

(5)
The reception device according to (4), wherein the discrimination circuit discriminates, as the communication modes of the data signal, a first data transmission mode and a second data transmission mode in which transmission speed is lower than transmission speed in the first data transmission mode.

(6)
The reception device according to any one of (1) to (5), wherein
the data signal receiver circuit is a differential data signal receiver circuit that receives the data signal, and a differential signal as the data blanking signal through the data signal line, and
the clock signal receiver circuit is a differential clock signal receiver circuit that receives the clock signal, and a differential signal as the clock blanking signal through the clock signal line.

(7)
A transmission device, including:
a data signal transmitter circuit that outputs a data signal to a data signal line, and outputs a data blanking signal through the data signal line in a blanking period of the data signal;
a clock signal transmitter circuit that outputs a clock signal to a clock signal line, and outputs a clock blanking signal, in place of the clock signal, in synchronization with the blanking period of the data signal; and
a blanking controller that controls one or both of a signal value of the data blanking signal and a signal value of the clock blanking signal to a value that enables discrimination of communication modes.

(8)
The transmission device according to (7), wherein the blanking controller controls the signal value to a value that enables discrimination of at least communication modes in the blanking period.

(9)
The transmission device according to (8), wherein the blanking controller controls the signal value to a value that enables discrimination of a first blanking mode and a second blanking mode as the communication modes in the blanking period, the second blanking mode in which a transmission period is longer than a transmission period in the first blanking mode.

(10)
The transmission device according to any one of (7) to (9), wherein the blanking controller controls the signal value to a value that enables discrimination of at least communication modes of the data signal.

(11)
The transmission device according to (10), wherein the blanking controller controls the signal value to a value that enables discrimination of a first data transmission mode and a second data transmission mode as the communication modes of the data signal, the second data transmission mode in which transmission speed is lower than transmission speed in the first data transmission mode.

(12)
The transmission device according to any one of (7) to (11), wherein the data signal transmitter circuit is a differential data signal transmitter circuit that outputs the data signal, and a differential signal as the data blanking signal through the data signal line, and
the clock signal transmitter circuit is a differential clock signal transmitter circuit that outputs the clock signal, and a differential signal as the clock blanking signal through the clock signal line.

(13)
A communication system, including:
a transmission device; and
a reception device,
the transmission device including:
a data signal transmitter circuit that outputs a data signal to a data signal line, and outputs a data blanking signal through the data signal line in a blanking period of the data signal,
a clock signal transmitter circuit that outputs a clock signal to a clock signal line, and outputs a clock blanking signal, in place of the clock signal, in synchronization with the blanking period of the data signal, and
a blanking controller that controls one or both of a signal value of the data blanking signal and a signal value of the clock blanking signal to a value that enables discrimination of communication modes, and
the reception device including:
a data signal receiver circuit that receives the data signal and the data blanking signal through the data signal line,
a clock signal receiver circuit that receives the clock signal and the clock blanking signal through the clock signal line, and
a discrimination circuit that discriminates the communication modes on a basis of one or both of the signal value of the data blanking signal and the signal value of the clock blanking signal.

(14)
A signal reception method, including:
receiving a data signal through a data signal line, and receiving a data blanking signal through the data signal line in a blanking period of the data signal;
receiving a clock signal and a clock blanking signal through a clock signal line, the clock blanking signal outputted in synchronization with the blanking period of the data signal; and discriminating communication modes on a basis of one or both of a signal value of the data blanking signal and a signal value of the clock blanking signal.

(15)

A signal transmission method, including:

outputting a data signal to a data signal line, and outputting a data blanking signal through the data signal line in a blanking period of the data signal;

outputting a clock signal to a clock signal line, and outputting a clock blanking signal, in place of the clock signal, in synchronization with the blanking period of the data signal; and controlling one or both of a signal value of the data blanking signal and a signal value of the clock blanking signal to a value that enables discrimination of communication modes.

(16)

A communication method, including:

outputting a data signal to a data signal line, and outputting a data blanking signal through the data signal line in a blanking period of the data signal;

outputting a clock signal to a clock signal line, and outputting a clock blanking signal, in place of the clock signal, in synchronization with the blanking period of the data signal;

controlling one or both of a signal value of the data blanking signal and a signal value of the clock blanking signal to a value that enables discrimination of a communication mode;

receiving the data signal and the data blanking signal through the data signal line;

receiving the clock signal and the clock blanking signal through the clock signal line; and discriminating the communication modes on a basis of one or both of the signal value of the data blanking signal and the signal value of the clock blanking signal.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1, 1B transmitter (transmission device)
2, 2B receiver (reception device)
11 CL-HS circuit (differential clock signal transmitter circuit)
12 CL-LP circuit (first single-ended signal transmitter circuit)
13 DL-HS circuit (differential data signal transmitter circuit)
14 DL-LP circuit (second single-ended signal transmitter circuit)
15 selector switch (first transmission switching circuit)
16 selector switch (second transmission switching circuit)
17 selector
18 selector
20 blanking controller
21 CL-HS circuit (differential clock signal receiver circuit)
22 CL-LP circuit (first single-ended signal receiver circuit)
23 DL-HS circuit (differential data signal receiver circuit)
24 DL-LP circuit (second single-ended signal receiver circuit)
25 selector (first reception switching circuit)
26 selector (second reception switching circuit)
27 selector
28 selector
30 clock signal line
31 data signal line
32 data signal line
33 data signal line
34 data signal line
35 control bus
41 LP state machine (LP FSM)
42 LP encoder (LP ENC)
43 LP driver (LP DRV)
44 LP receiver (LP RCV)
45 LP decoder (LP DEC)
46 LP state machine (LP FSM)
51 HS state machine (HS FSM)
52 selector
53 parallel-serial (PS) conversion circuit
54 clock frequency divider (DIV)
55 HS driver (HS DRV)
56 termination circuit (TERM) (clock signal termination circuit)
57 HS receiver (HS RCV)
58 clock frequency divider (DIV)
59 clock (CL) state discrimination circuit
61 LP state machine (LP FSM)
62 LP encoder (LP ENC)
63 LP driver (LP DRV)
64 LP receiver (LP RCV)
65 LP decoder (LP DEC)
66 LP state machine (LP FSM)
71 HS state machine (HS FSM)
72 selector
73 parallel-serial (PS) conversion circuit
74 HS driver (HS DRV)
75 termination circuit (TERM) (data signal termination circuit)
76 HS receiver (HS RCV)
77 clock frequency divider (DIV)
78 word alignment correction circuit (ALN)
81 PLL circuit
82 crystal oscillator (XTAL)
83 crystal oscillator (XTAL)
84 PLL circuit
101 transmitter
102 receiver
111 CL-HS circuit
112 CL-LP circuit
113 DL-HS circuit
114 DL-LP circuit
121 CL-HS circuit
122 CL-LP circuit
123 DL-HS circuit
124 DL-LP circuit
300 smartphone
301 vehicle
302 ECU
310 application processor
311 CPU
312 memory controller
313 power source controller
314 external interface
315 GPU
316 media processor
317 display controller
318 media processor
319 system bus
401, 402, 403, 404 vehicle-mounted camera
410 image sensor
411 sensor 412 ISP
413 JPEG encxler
414 CPU
415 RAM
416 ROM
417 power source controller
418 PC interface
419 MIPI interface
420 system bus
431 image sensor
432 DSP circuit
433 selector
434 SerDes circuit
441 connection interface
442 connection interface
501 memory
502 wireless communication section
504 display
AP application processor
IS image sensor
TX transmitter
RX receiver
Dp signal line
Dn signal line
CL clock lane
DL, DL1, DL2, DL3, DL4 data lane

The invention claimed is:

1. A reception device comprising:
a data signal receiver circuit configured to receive a data signal and a data blanking signal from a transmission device that is operating in one of a plurality of communication modes, the data blanking signal is received during a blanking period of the data signal;
a clock signal receiver circuit configured to receive a clock signal and a clock blanking signal that is in synchronization with the blanking period of the data signal from the transmission device; and
a determination circuit configured to determine that the transmission device is operating in the one of the plurality of communication modes on a basis of a signal value of the data blanking signal, a signal value of the clock blanking signal, or both, wherein
a first mode of the plurality of communication modes is a high speed mode,
a second mode of the plurality of communication modes is a low power mode,
a third mode of the plurality of communication modes is one of a high speed idle mode or an alternative low power mode,
the low power mode comprises a data transmission speed that is lower than a data transmission speed of the high speed mode, and
the low power mode comprises a voltage level that is different than a voltage level of the high speed mode.

2. The reception device according to claim 1, further comprising:
a terminator,
wherein the high speed idle mode does not have signal activity during the blanking period, and
responsive to determining that the transmission device is operating in the high speed idle mode, the data signal receiver circuit is further configured to not perform a termination control of the terminator during the blanking period.

3. The reception device according to claim 1, further comprising:
a terminator,
wherein the alternative low power mode does not have signal activity during the blanking period, and
responsive to determining that the transmission device is operating in the alternative low power mode, the data signal receiver circuit is further configured to perform a termination control of the terminator during the blanking period.

4. The reception device according to claim 2, wherein
the data signal transmitted by the transmission device operating in the first mode or the third mode is a differential signal, and
the data signal transmitted by the transmission device operating in the second mode is a single-ended signal.

5. The reception device according to claim 2, wherein
the clock signal transmitted by the transmission device operating in the first mode or the third mode is a differential signal, and
the clock signal transmitted by the transmission device operating in the second mode is a single-ended signal.

6. A reception device comprising:
a data signal receiver circuit configured to receive a data signal from a transmission device that operates in a plurality of communication modes via a data lane, the plurality of communication modes including a first mode, a second mode, and a third mode;
a clock signal receiver circuit configured to receive a clock signal from the transmission device that operates in the plurality of communication modes via a clock lane; and
a determination circuit configured to determine that the transmission device is operating in one of the plurality of communication modes on a basis of a signal value of the data signal and a transition of the clock signal, the transition of the clock signal being indicative of the transmission device transitioning from another mode of the plurality of communication modes to the one of the plurality of communication modes.

7. The reception device according to claim 6, wherein
the first mode is a high speed mode,
the second mode is a low power mode, and
the third mode is one of a high speed idle mode or an alternative low power mode.

8. The reception device according to claim 7, wherein the transition of the clock signal is indicative of the transmission device transitioning from the high speed mode to the low power mode.

9. The reception device according to claim 8, wherein the transmission device is already operating in the low power mode when the transition of the clock signal is indicative of the transmission device transitioning from the high speed mode to the low power mode.

10. The reception device according to claim 7, wherein the transition of the clock signal s indicative of the transmission device transitioning from the high speed mode to the high speed idle mode.

11. The reception device according to claim 10, wherein the transmission device is already operating in the high speed idle mode when the transition of the clock signal is indicative of the transmission device transitioning from the high speed mode to the high speed idle mode.

12. The reception device according to claim 7, wherein the transition of the clock signal is indicative of the transmission device transitioning from the low power mode to the high speed mode.

13. The reception device according to claim 12, wherein the transmission device is not yet operating in the high speed mode when the transition of the clock signal is indicative of the transmission device transitioning from the low power mode to the high speed mode.

14. The reception device according to claim 7, wherein the transition of the clock signal is indicative of the transmission device transitioning from the high speed idle mode to the high speed mode.

15. The reception device according to claim 14, wherein the transmission device is not yet operating in the high speed mode when the transition of the clock signal is indicative of the transmission device transitioning from the high speed idle mode to the high speed mode.

16. The reception device according to claim 6, wherein the clock signal receiver circuit is further configured to
detect when the clock signal is not received from the transmission device via the clock lane during a period of time, and
responsive to detecting that the clock signal is not received from the transmission device via the clock lane during the period of time, output a first control signal to the determination circuit,
the data signal receiver circuit is further configured to
detect when the signal value of the data signal is a first value,
responsive to detecting when the signal value of the data signal is the first value, output a second control signal to the determination circuit, and
responsive to detecting when the signal value of the data signal is not the first value, output a third control signal to the determination circuit, the third control signal being different than the second control signal, and
the determination circuit is further configured to
receive the first control signal, the second control signal, and the third control signal, and
determine the transmission device is operating in the one of the plurality of communication modes on a basis of receiving the first control signal and the second control signal or receiving the first control signal and the third control signal.

17. The reception device according to claim 16, wherein the clock signal receiver circuit includes a counter that is configured to count a second clock signal that is different than the clock signal, and
to detect when the clock signal is not received from the transmission device via the clock lane during the period of time, the clock signal receiver circuit is further configured to control the counter to count a plurality of clock transitions of the second clock signal that exceeds the period of time.

18. A communication system, comprising:
a transmission device including
a data signal transmitter circuit configured to
operate in a plurality of communication modes to transmit a data signal via a data lane, and
transmit a data blanking signal in a blanking period of the data signal via the data lane;
a clock signal transmitter circuit configured to transmit a clock signal and a clock blanking signal in synchronization with the blanking period of the data signal via a clock lane; and
a blanking controller configured to control a signal value of the data blanking signal, a signal value of the clock blanking signal, or both to be indicative of the one of the plurality of communication modes; and
a reception device including
a data signal receiver circuit configured to receive the data signal and the data blanking signal from the transmission device that is operating in the one of the plurality of communication modes via the data lane, the data blanking signal is received during the blanking period of the data signal;
a clock signal receiver circuit configured to receive the clock signal and the clock blanking signal that is in synchronization with the blanking period of the data signal from the transmission device via the clock lane; and
a determination circuit configured to determine that the transmission device is operating in the one of the plurality of communication modes on a basis of the signal value of the data blanking signal, the signal value of the clock blanking signal, or both, wherein
a first mode of the plurality of communication modes is a high speed mode,
a second mode of the plurality of communication modes is a low power mode,
a third mode of the plurality of communication modes is one of a high speed idle mode or an alternative low power mode,
the low power mode comprises a data transmission speed that is lower than a data transmission speed of the high speed mode, and
the low power mode comprises a voltage level that is different than a voltage level of the high speed mode.

19. A transmission device comprising:
a data signal transmitter circuit configured to operate in a plurality of communication modes to transmit a data signal to a reception device via a data lane, and
transmit a data blanking signal in a blanking period of the data signal to the reception device via the data lane;
a clock signal transmitter circuit configured to transmit a clock signal and a clock blanking signal in synchronization with the blanking period of the data signal to the reception device via a clock lane; and
a blanking controller configured to control a signal value of the data blanking signal, a signal value of the clock blanking signal, or both to indicate that the data signal transmitter circuit is operating in the one of the plurality of communication modes, wherein
a first mode of the plurality of communication modes is a high speed mode,
a second mode of the plurality of communication modes is a low power mode,
a third mode of the plurality of communication modes is one of a high speed idle mode or an alternative low power mode,
the low power mode comprises a data transmission speed that is lower than a data transmission speed of the high speed mode, and
the low power mode comprises a voltage level that is different than a voltage level of the high speed mode.

20. The transmission device according to claim 19, wherein
the data signal transmitted by the data signal transmitter circuit operating in the first mode or the third mode is a differential signal,
the data signal transmitted by the data signal transmitter circuit operating in the second mode is a single-ended signal,
the clock signal transmitted by the clock signal transmitter circuit, when the data signal transmitter circuit is operating in the first mode or the third mode, is the differential signal, and the clock signal transmitted by the clock signal transmitter circuit, when the data signal transmitter circuit, is operating in the second mode is the single-ended signal.

21. A signal reception method, the method comprising:

receiving, with a data signal receiver of a reception device, a data signal and a data blanking signal from a transmission device that is operating in one of a plurality of communication modes via a data lane, the data blanking signal is received during a blanking period of the data signal;

receiving a clock signal and a clock blanking signal that is in synchronization with the blanking period of the data signal from the transmission device; and determining that the transmission device is operating in the one of the plurality of communication modes on a basis of a signal value of the data blanking signal, a signal value of the clock blanking signal, or both, wherein a first mode of the plurality of communication modes is a high speed mode, a second mode of the plurality of communication modes is a low power mode, a third mode of the plurality of communication modes is one of a high speed idle mode or an alternative low power mode, the low power mode comprises a data transmission speed that is lower than a data transmission speed of the high speed mode, and the low power mode comprises a voltage level that is different than a voltage level of the high speed mode.

22. A signal transmission method, the method comprising:

operating, with a data signal transmitter circuit of a transmission device, in one of a plurality of communication modes to transmit a data signal to a reception device via a data lane;

responsive to operating in the one of the plurality of communication modes, controlling a signal value of a data blanking signal, a signal value of a clock blanking signal, or both to be indicative of the one of the plurality of communication modes;

transmitting the data blanking signal to the reception device during a blanking period of the data signal via the data lane; and transmitting a clock signal and the clock blanking signal in synchronization with the blanking period of the data signal to the reception device via a clock lane, wherein a first mode of the plurality of communication modes is a high speed mode, a second mode of the plurality of communication modes is a low power mode, a third mode of the plurality of communication modes is one of a high speed idle mode or an alternative low power mode, the low power mode comprises a data transmission speed that is lower than a data transmission speed of the high speed mode, and the low power mode comprises a voltage level that is different than a voltage level of the high speed mode.

23. A communication method, the method comprising:

operating, with a data signal transmitter circuit of a transmission device, in one of a plurality of communication modes to transmit a data signal via a data lane;

responsive to operating in the one of the plurality of communication modes, controlling a signal value of a data blanking signal, a signal value of a clock blanking signal, or both to be indicative of the one of the plurality of communication modes;

transmitting the data blanking signal during a blanking period of the data signal via the data lane;

transmitting a clock signal and the clock blanking signal in synchronization with the blanking period of the data signal via a clock lane;

receiving, with a data signal receiver of a reception device, the data signal and the data blanking signal from the transmission device that is operating in the one of the plurality of communication modes via the data lane, the data blanking signal is received during the blanking period of the data signal;

receiving the clock signal and the clock blanking signal that is in synchronization with the blanking period of the data signal from the transmission device; and determining that the transmission device is operating in the one of the plurality of communication modes on a basis of the signal value of the data blanking signal, the signal value of the clock blanking signal, or both, wherein a first mode of the plurality of communication modes is a high speed mode, a second mode of the plurality of communication modes is a low power mode, a third mode of the plurality of communication modes is one of a high speed idle mode or an alternative low power mode, the low power mode comprises a data transmission speed that is lower than a data transmission speed of the high speed mode, and the low power mode comprises a voltage level that is different than a voltage level of the high speed mode.

* * * * *